United States Patent
Murao et al.

(10) Patent No.: US 10,725,319 B2
(45) Date of Patent: Jul. 28, 2020

(54) DISPLAY DEVICE AND LIQUID CRYSTAL PANEL DRIVING METHOD

(71) Applicant: SHARP KABUSHIKI KAISHA, Sakai, Osaka (JP)

(72) Inventors: Takehiro Murao, Sakai (JP); Ryoh Kikuchi, Sakai (JP); Takayuki Yamada, Sakai (JP); Nathan James Smith, Oxford (GB); Andre Filipe Marques Da Silva, Oxford (GB); Martin Paul Buckthorpe, Oxford (GB)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 31 days.

(21) Appl. No.: 16/065,910

(22) PCT Filed: Jan. 6, 2017

(86) PCT No.: PCT/JP2017/000305
§ 371 (c)(1),
(2) Date: Jun. 25, 2018

(87) PCT Pub. No.: WO2017/122595
PCT Pub. Date: Jul. 20, 2017

(65) Prior Publication Data
US 2019/0011717 A1    Jan. 10, 2019

(30) Foreign Application Priority Data
Jan. 13, 2016    (JP) .................................. 2016-004756

(51) Int. Cl.
G02B 30/27    (2020.01)
G09G 3/36    (2006.01)
G09G 3/00    (2006.01)
G09G 3/20    (2006.01)
H04N 13/30    (2018.01)
(Continued)

(52) U.S. Cl.
CPC ............. G02B 30/27 (2020.01); G02B 30/00 (2020.01); G02F 1/13306 (2013.01);
(Continued)

(58) Field of Classification Search
CPC ................... G02B 27/22; H04N 13/00; H04N 13/366–376; H04N 13/302
See application file for complete search history.

(56) References Cited

U.S. PATENT DOCUMENTS

2006/0215262 A1    9/2006    Kim
2007/0183015 A1    8/2007    Jacobs et al.
(Continued)

FOREIGN PATENT DOCUMENTS

JP    2006-189766 A    7/2006
JP    2007-293270 A    11/2007
(Continued)

Primary Examiner — Michael H Caley
Assistant Examiner — Jonathan Y Jung
(74) Attorney, Agent, or Firm — ScienBiziP, P.C.

(57) ABSTRACT

Provided is a display device capable of high-quality three-dimensional displaying. During three-dimensional displaying for a viewing position β, in a first term, an entirety of a first predetermined region of a second liquid crystal panel takes on a light-blocking state and a first adjacent region, which is adjacent to the first predetermined region in the first direction, takes on a light-transmitting state. In a second term, at least one of two side regions in the first predetermined region takes on the light-transmitting state, a remaining region of the first predetermined region takes on the light-blocking state, and at least part of the first adjacent region takes on the light-transmitting state.

12 Claims, 38 Drawing Sheets

(51) Int. Cl.
  *G02B 30/00* (2020.01)
  *G02F 1/133* (2006.01)
  *G02F 1/1343* (2006.01)

(52) U.S. Cl.
  CPC ....... *G02F 1/134327* (2013.01); *G09G 3/003* (2013.01); *G09G 3/20* (2013.01); *G09G 3/36* (2013.01); *G09G 3/3648* (2013.01); *H04N 13/30* (2018.05); *G09G 2300/023* (2013.01)

(56) References Cited

U.S. PATENT DOCUMENTS

| | | | | |
|---|---|---|---|---|
| 2012/0057108 A1* | 3/2012 | Okamoto | ............... | G02B 30/27 349/104 |
| 2012/0206503 A1* | 8/2012 | Hirakata | .............. | H04N 13/359 345/690 |
| 2013/0176511 A1* | 7/2013 | Hoshino | ............... | G02F 1/1313 349/15 |
| 2014/0063209 A1* | 3/2014 | Watanabe | .............. | G02B 30/27 348/51 |
| 2014/0184960 A1* | 7/2014 | Yang | ...................... | G02B 30/27 349/15 |
| 2015/0219909 A1* | 8/2015 | Jeong | ..................... | G02B 30/26 349/15 |
| 2015/0249818 A1* | 9/2015 | Murao | ................... | G02B 30/27 348/59 |

FOREIGN PATENT DOCUMENTS

| | | |
|---|---|---|
| JP | 2014-102411 A | 6/2014 |
| WO | 2012/176446 A1 | 12/2012 |

\* cited by examiner

FIG. 4
(a)
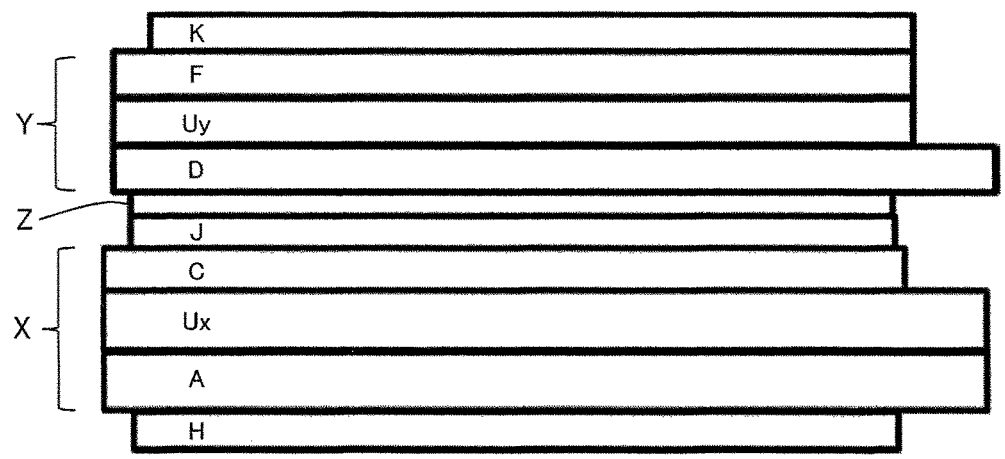
(b)
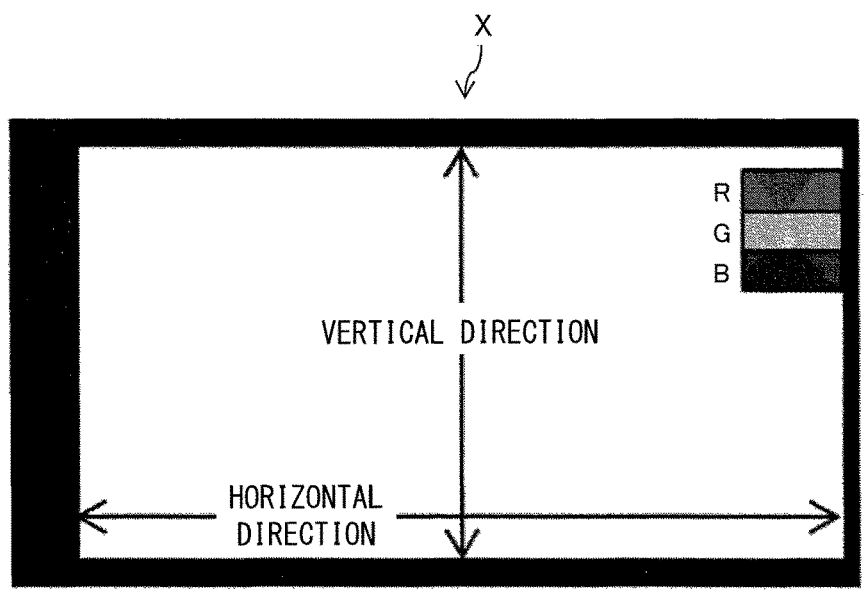

FIG. 9

ELECTRODE DRIVING PATTERNS FOR EACH TERM AT VIEWING POSITIONS 1 TO 6 (EMBODIMENT 1)

T=1 CYCLE (8ms)
M⇒NORMAL PHASE SIGNAL:Vm=3.5V (OR 4.3V)
N⇒OPPOSITE PHASE SIGNAL:Vn=3.5V (OR 4.3V)

| | 1E | 2E | 3E | 4E | 5E | 6E | 7E | 8E | 9E | 10E | 11E | 12E |
|---|---|---|---|---|---|---|---|---|---|---|---|---|
| P1E1 (0.4T) | M | M | M | M | M | M | M | M | N | N | N | M |
| P1E2 (0.6T) | M | M | N | N | M | M | M | M | M | M | M | M |
| P2E1 (0.4T) | M | M | N | N | N | M | M | M | M | M | M | M |
| P2E2 (0.6T) | M | M | M | M | M | M | M | M | N | N | N | M |
| P3E1 (0.4T) | M | M | M | M | M | M | M | M | N | N | N | N |
| P3E2 (0.6T) | M | M | M | N | N | M | M | M | M | M | M | M |
| P4E1 (0.4T) | M | M | M | N | N | N | M | M | M | M | M | M |
| P4E2 (0.6T) | M | M | M | M | M | M | M | M | M | M | N | N |
| P5E1 (0.4T) | M | M | M | M | M | M | N | M | M | M | N | N |
| P5E2 (0.6T) | M | M | M | M | N | N | M | M | M | M | M | M |
| P6E1 (0.4T) | N | M | M | M | N | N | M | M | M | M | M | M |
| P6E2 (0.6T) | M | M | M | M | M | M | N | M | M | M | M | N |

FIG. 10

ELECTRODE DRIVING PATTERNS FOR EACH TERM AT VIEWING POSITIONS 7 TO 12 (EMBODIMENT 1)

T=1 CYCLE (8ms)  
M ⇒ NORMAL PHASE SIGNAL: Vm=3.5V (OR 4.3V)  
N ⇒ OPPOSITE PHASE SIGNAL: Vn=3.5V (OR 4.3V)

| P7E1 (0.4T) | 1E | 2E | 3E | 4E | 5E | 6E | 7E | 8E | 9E | 10E | 11E | 12E |
|---|---|---|---|---|---|---|---|---|---|---|---|---|
|  | M | M | M | M | M | M | N | N | M | M | M | N |

| P7E2 (0.6T) | 1E | 2E | 3E | 4E | 5E | 6E | 7E | 8E | 9E | 10E | 11E | 12E |
|---|---|---|---|---|---|---|---|---|---|---|---|---|
|  | N | M | M | M | M | N | M | M | M | M | M | M |

| P8E1 (0.4T) | 1E | 2E | 3E | 4E | 5E | 6E | 7E | 8E | 9E | 10E | 11E | 12E |
|---|---|---|---|---|---|---|---|---|---|---|---|---|
|  | N | N | M | M | M | N | M | M | M | M | M | M |

| P8E2 (0.6T) | 1E | 2E | 3E | 4E | 5E | 6E | 7E | 8E | 9E | 10E | 11E | 12E |
|---|---|---|---|---|---|---|---|---|---|---|---|---|
|  | M | M | M | M | M | M | N | N | M | M | M | M |

| P9E1 (0.4T) | 1E | 2E | 3E | 4E | 5E | 6E | 7E | 8E | 9E | 10E | 11E | 12E |
|---|---|---|---|---|---|---|---|---|---|---|---|---|
|  | M | M | M | M | M | M | N | N | N | M | M | M |

| P9E2 (0.6T) | 1E | 2E | 3E | 4E | 5E | 6E | 7E | 8E | 9E | 10E | 11E | 12E |
|---|---|---|---|---|---|---|---|---|---|---|---|---|
|  | N | N | M | M | M | M | M | M | M | M | M | M |

| P10E1 (0.4T) | 1E | 2E | 3E | 4E | 5E | 6E | 7E | 8E | 9E | 10E | 11E | 12E |
|---|---|---|---|---|---|---|---|---|---|---|---|---|
|  | N | N | N | M | M | M | M | M | M | M | M | M |

| P10E2 (0.6T) | 1E | 2E | 3E | 4E | 5E | 6E | 7E | 8E | 9E | 10E | 11E | 12E |
|---|---|---|---|---|---|---|---|---|---|---|---|---|
|  | M | M | M | M | M | M | M | N | N | M | M | M |

| P11E1 (0.4T) | 1E | 2E | 3E | 4E | 5E | 6E | 7E | 8E | 9E | 10E | 11E | 12E |
|---|---|---|---|---|---|---|---|---|---|---|---|---|
|  | M | M | M | M | M | M | N | N | N | M | M | M |

| P11E2 (0.6T) | 1E | 2E | 3E | 4E | 5E | 6E | 7E | 8E | 9E | 10E | 11E | 12E |
|---|---|---|---|---|---|---|---|---|---|---|---|---|
|  | M | N | N | M | M | M | M | M | M | M | M | M |

| P12E1 (0.4T) | 1E | 2E | 3E | 4E | 5E | 6E | 7E | 8E | 9E | 10E | 11E | 12E |
|---|---|---|---|---|---|---|---|---|---|---|---|---|
|  | M | N | N | N | M | M | M | M | M | M | M | M |

| P12E2 (0.6T) | 1E | 2E | 3E | 4E | 5E | 6E | 7E | 8E | 9E | 10E | 11E | 12E |
|---|---|---|---|---|---|---|---|---|---|---|---|---|
|  | M | M | M | M | M | M | M | N | N | M | M |

FIG. 11
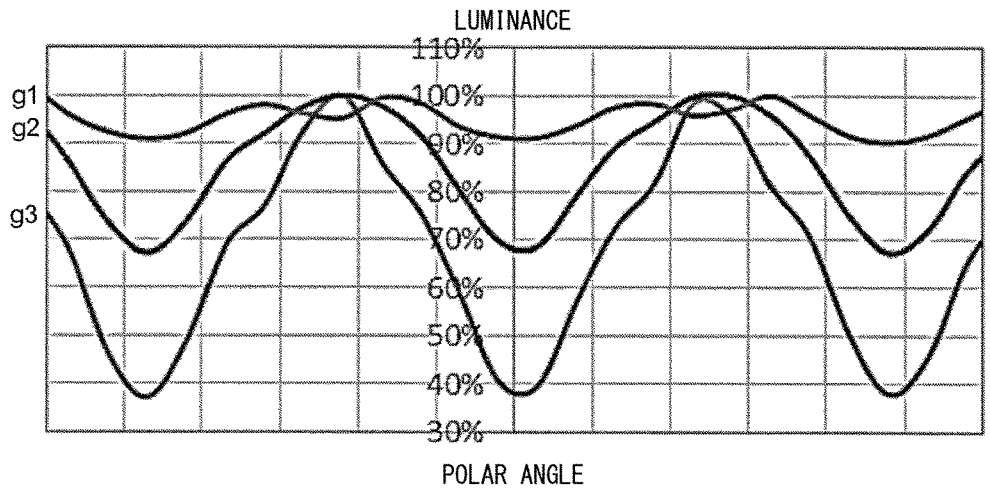
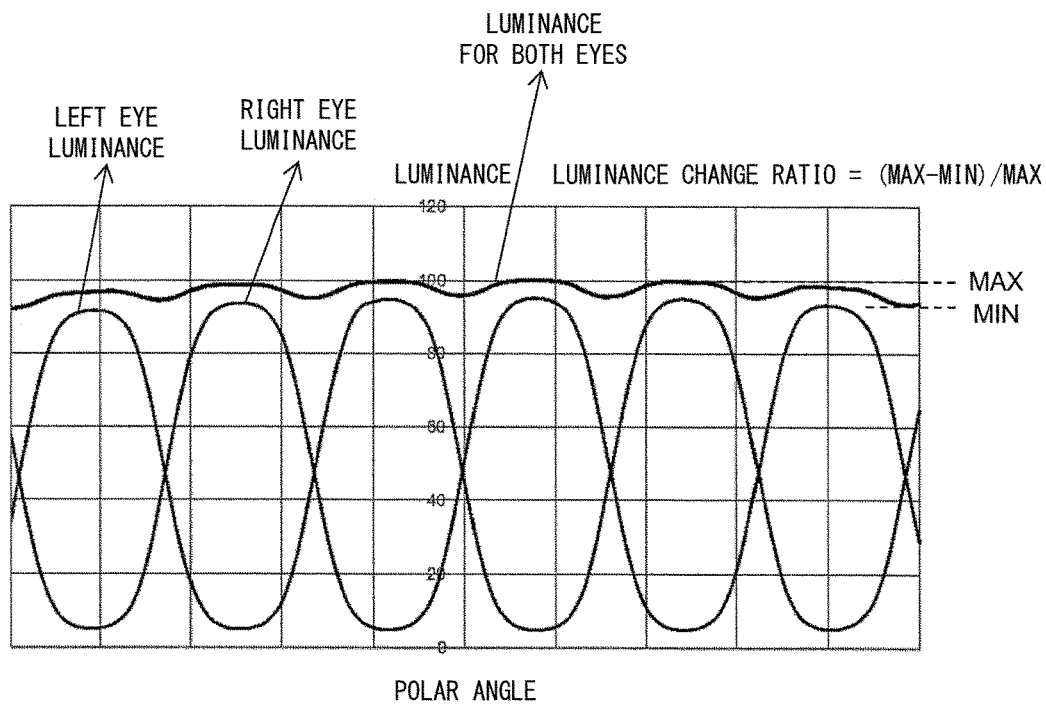

FIG. 15

| ELECTRODE DRIVING PATTERNS FOR EACH TERM AT VIEWING POSITIONS 0.5 TO 4 (EMBODIMENT 2) |
| --- |
| *=TIME DIVISION |
| T=1 CYCLE(8ms)  M⇒NORMAL PHASE SIGNAL:Vm=3.5V(OR 4.3V)  N⇒OPPOSITE PHASE SIGNAL:Vn=3.5V(OR 4.3V) |

| P0.5E1 (0.5T)* | 1E | 2E | 3E | 4E | 5E | 6E | 7E | 8E | 9E | 10E | 11E | 12E |
| --- | --- | --- | --- | --- | --- | --- | --- | --- | --- | --- | --- | --- |
|  | M | N | N | N | M | M | M | M | M | M | M | M |
| P0.5E2 (0.5T)* | 1E | 2E | 3E | 4E | 5E | 6E | 7E | 8E | 9E | 10E | 11E | 12E |
|  | M | M | M | M | M | M | M | M | N | N | N | M |
| P1E1 (0.5T) | 1E | 2E | 3E | 4E | 5E | 6E | 7E | 8E | 9E | 10E | 11E | 12E |
|  | M | M | M | M | M | M | M | M | N | N | N | M |
| P1E2 (0.5T) | 1E | 2E | 3E | 4E | 5E | 6E | 7E | 8E | 9E | 10E | 11E | 12E |
|  | M | M | M | M | M | M | M | M | N | N | N | M |
| P1.5E1 (0.5T)* | 1E | 2E | 3E | 4E | 5E | 6E | 7E | 8E | 9E | 10E | 11E | 12E |
|  | M | M | M | M | M | M | M | M | N | N | N | M |
| P1.5E2 (0.5T)* | 1E | 2E | 3E | 4E | 5E | 6E | 7E | 8E | 9E | 10E | 11E | 12E |
|  | M | M | N | N | N | M | M | M | M | M | M | M |
| P2E1 (0.5T) | 1E | 2E | 3E | 4E | 5E | 6E | 7E | 8E | 9E | 10E | 11E | 12E |
|  | M | M | N | N | N | M | M | M | M | M | M | M |
| P2E2 (0.5T) | 1E | 2E | 3E | 4E | 5E | 6E | 7E | 8E | 9E | 10E | 11E | 12E |
|  | M | M | N | N | N | M | M | M | M | M | M | M |
| P2.5E1 (0.5T)* | 1E | 2E | 3E | 4E | 5E | 6E | 7E | 8E | 9E | 10E | 11E | 12E |
|  | M | M | N | N | N | M | M | M | M | M | M | M |
| P2.5E2 (0.5T)* | 1E | 2E | 3E | 4E | 5E | 6E | 7E | 8E | 9E | 10E | 11E | 12E |
|  | M | M | M | M | M | M | M | M | M | N | N | N |
| P3E1 (0.5T) | 1E | 2E | 3E | 4E | 5E | 6E | 7E | 8E | 9E | 10E | 11E | 12E |
|  | M | M | M | M | M | M | M | M | M | N | N | N |
| P3E2 (0.5T) | 1E | 2E | 3E | 4E | 5E | 6E | 7E | 8E | 9E | 10E | 11E | 12E |
|  | M | M | M | M | M | M | M | M | M | N | N | N |
| P3.5E1 (0.5T)* | 1E | 2E | 3E | 4E | 5E | 6E | 7E | 8E | 9E | 10E | 11E | 12E |
|  | M | M | M | M | M | M | M | M | M | N | N | N |
| P3.5E2 (0.5T)* | 1E | 2E | 3E | 4E | 5E | 6E | 7E | 8E | 9E | 10E | 11E | 12E |
|  | M | M | M | N | N | N | M | M | M | M | M | M |
| P4E1 (0.5T) | 1E | 2E | 3E | 4E | 5E | 6E | 7E | 8E | 9E | 10E | 11E | 12E |
|  | M | M | M | N | N | N | M | M | M | M | M | M |
| P4E2 (0.5T) | 1E | 2E | 3E | 4E | 5E | 6E | 7E | 8E | 9E | 10E | 11E | 12E |
|  | M | M | M | N | N | N | M | M | M | M | M | M |

FIG. 16

ELECTRODE DRIVING PATTERNS FOR EACH TERM AT VIEWING POSITIONS 4.5 TO 8 (EMBODIMENT 2)
*=TIME DIVISION
T=1 CYCLE(8ms) M⇒NORMAL PHASE SIGNAL:Vm=3.5V(OR 4.3V) N⇒OPPOSITE PHASE SIGNAL:Vn=3.5V(OR 4.3V)

| | 1E | 2E | 3E | 4E | 5E | 6E | 7E | 8E | 9E | 10E | 11E | 12E |
|---|---|---|---|---|---|---|---|---|---|---|---|---|
| P4.5E1 (0.5T)* | M | M | M | N | N | N | M | M | M | M | M | M |
| P4.5E2 (0.5T)* | M | M | M | M | M | M | N | M | M | M | N | N |
| P5E1 (0.5T) | M | M | M | M | M | M | N | M | M | M | N | N |
| P5E2 (0.5T) | M | M | M | M | M | M | N | M | M | M | N | N |
| P5.5E1 (0.5T)* | M | M | M | M | M | M | N | M | M | M | N | N |
| P5.5E2 (0.5T)* | N | M | M | M | N | N | M | M | M | M | M | M |
| P6E1 (0.5T) | N | M | M | M | N | N | M | M | M | M | M | M |
| P6E2 (0.5T) | N | M | M | M | N | N | M | M | M | M | M | M |
| P6.5E1 (0.5T)* | N | M | M | M | N | N | M | M | M | M | M | M |
| P6.5E2 (0.5T)* | M | M | M | M | M | M | N | N | M | M | M | N |
| P7E1 (0.5T) | M | M | M | M | M | M | N | N | M | M | M | N |
| P7E2 (0.5T) | M | M | M | M | M | M | N | N | M | M | M | N |
| P7.5E1 (0.5T)* | M | M | M | M | M | M | N | N | M | M | M | N |
| P7.5E2 (0.5T)* | N | N | M | M | M | N | M | M | M | M | M | M |
| P8E1 (0.5T) | N | N | M | M | M | N | M | M | M | M | M | M |
| P8E2 (0.5T) | N | N | M | M | M | N | M | M | M | M | M | M |

FIG. 17

| ELECTRODE DRIVING PATTERNS FOR EACH TERM AT VIEWING POSITIONS 8.5 TO 12 (EMBODIMENT 2) |||||||||||||
| --- | --- | --- | --- | --- | --- | --- | --- | --- | --- | --- | --- | --- |
| *=TIME DIVISION |||||||||||||
| T=1 CYCLE(8ms)  M⇒NORMAL PHASE SIGNAL:Vm=3.5V(OR 4.3V)  N⇒OPPOSITE PHASE SIGNAL:Vn=3.5V(OR 4.3V) |||||||||||||
| P8.5E1 (0.5T)* | 1E | 2E | 3E | 4E | 5E | 6E | 7E | 8E | 9E | 10E | 11E | 12E |
|  | N | N | M | M | M | N | M | M | M | M | M | M |
| P8.5E2 (0.5T)* | 1E | 2E | 3E | 4E | 5E | 6E | 7E | 8E | 9E | 10E | 11E | 12E |
|  | M | M | M | M | M | M | N | N | N | M | M | M |
| P9E1 (0.5T) | 1E | 2E | 3E | 4E | 5E | 6E | 7E | 8E | 9E | 10E | 11E | 12E |
|  | M | M | M | M | M | M | N | N | N | M | M | M |
| P9E2 (0.5T) | 1E | 2E | 3E | 4E | 5E | 6E | 7E | 8E | 9E | 10E | 11E | 12E |
|  | M | M | M | M | M | M | N | N | N | M | M | M |
| P9.5E1 (0.5T)* | 1E | 2E | 3E | 4E | 5E | 6E | 7E | 8E | 9E | 10E | 11E | 12E |
|  | M | M | M | M | M | M | N | N | N | M | M | M |
| P9.5E2 (0.5T)* | 1E | 2E | 3E | 4E | 5E | 6E | 7E | 8E | 9E | 10E | 11E | 12E |
|  | N | N | N | M | M | M | M | M | M | M | M | M |
| P10E1 (0.5T) | 1E | 2E | 3E | 4E | 5E | 6E | 7E | 8E | 9E | 10E | 11E | 12E |
|  | N | N | N | M | M | M | M | M | M | M | M | M |
| P10E2 (0.5T) | 1E | 2E | 3E | 4E | 5E | 6E | 7E | 8E | 9E | 10E | 11E | 12E |
|  | N | N | N | M | M | M | M | M | M | M | M | M |
| P10.5E1 (0.5T)* | 1E | 2E | 3E | 4E | 5E | 6E | 7E | 8E | 9E | 10E | 11E | 12E |
|  | N | N | N | M | M | M | M | M | M | M | M | M |
| P10.5E2 (0.5T)* | 1E | 2E | 3E | 4E | 5E | 6E | 7E | 8E | 9E | 10E | 11E | 12E |
|  | M | M | M | M | M | M | M | N | N | N | M | M |
| P11E1 (0.5T) | 1E | 2E | 3E | 4E | 5E | 6E | 7E | 8E | 9E | 10E | 11E | 12E |
|  | M | M | M | M | M | M | M | N | N | N | M | M |
| P11E2 (0.5T) | 1E | 2E | 3E | 4E | 5E | 6E | 7E | 8E | 9E | 10E | 11E | 12E |
|  | M | M | M | M | M | M | M | N | N | N | M | M |
| P11.5E1 (0.5T)* | 1E | 2E | 3E | 4E | 5E | 6E | 7E | 8E | 9E | 10E | 11E | 12E |
|  | M | M | M | M | M | M | M | N | N | N | M | M |
| P11.5E2 (0.5T)* | 1E | 2E | 3E | 4E | 5E | 6E | 7E | 8E | 9E | 10E | 11E | 12E |
|  | M | N | N | N | M | M | M | M | M | M | M | M |
| P12E1 (0.5T) | 1E | 2E | 3E | 4E | 5E | 6E | 7E | 8E | 9E | 10E | 11E | 12E |
|  | M | N | N | N | M | M | M | M | M | M | M | M |
| P12E2 (0.5T) | 1E | 2E | 3E | 4E | 5E | 6E | 7E | 8E | 9E | 10E | 11E | 12E |
|  | M | N | N | N | M | M | M | M | M | M | M | M |

FIG. 18
(a)
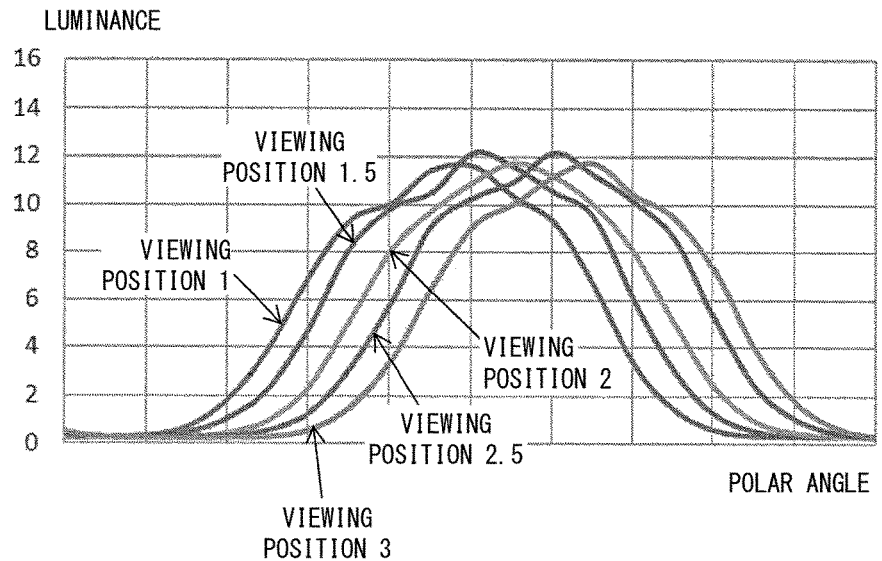
(b)
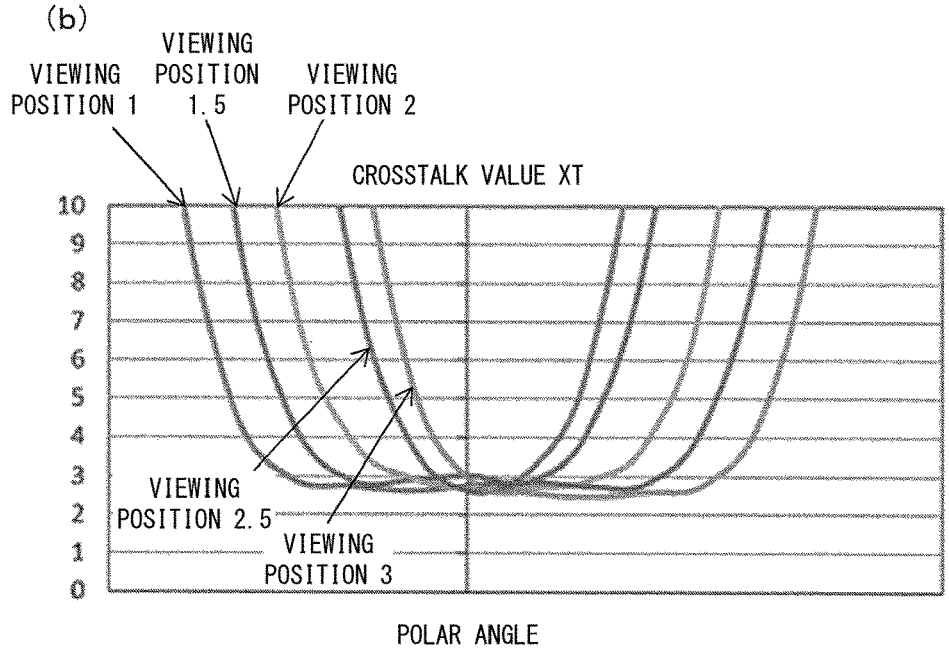

FIG. 22

ELECTRODE DRIVING PATTERNS FOR EACH TERM AT VIEWING POSITIONS 1 TO 6 (EMBODIMENT 3)

T=1 CYCLE (8ms)    M⇒NORMAL PHASE SIGNAL: Vm=3.5V (OR 4.3V)
                   N⇒OPPOSITE PHASE SIGNAL: Vn=3.5V (OR 4.3V)

| | 1E | 2E | 3E | 4E | 5E | 6E | 7E | 8E | 9E | 10E | 11E | 12E | Ec |
|---|---|---|---|---|---|---|---|---|---|---|---|---|---|
| P1E1 (0.4T) | M | M | M | M | N | N | N | N | N | N | M | M | M |
| P1E2 (0.6T) | M | M | M | M | M | N | N | N | N | M | M | M | M |
| P2E1 (0.4T) | M | M | M | M | M | N | N | N | N | N | N | M | M |
| P2E2 (0.6T) | M | M | M | M | M | M | N | N | N | N | M | M | M |
| P3E1 (0.4T) | M | M | M | M | M | M | N | N | N | N | N | N | M |
| P3E2 (0.6T) | M | M | M | M | M | M | M | N | N | N | N | M | M |
| P4E1 (0.4T) | N | M | M | M | M | M | M | N | N | N | N | N | M |
| P4E2 (0.6T) | M | M | M | M | M | M | M | M | N | N | N | N | M |
| P5E1 (0.4T) | N | N | M | M | M | M | M | M | N | N | N | N | M |
| P5E2 (0.6T) | N | M | M | M | M | M | M | M | M | N | N | N | M |
| P6E1 (0.4T) | N | N | N | M | M | M | M | M | M | N | N | N | M |
| P6E2 (0.6T) | N | N | M | M | M | M | M | M | M | M | N | N | M |

FIG. 23

ELECTRODE DRIVING PATTERNS FOR EACH TERM AT VIEWING POSITIONS 7 TO 12 (EMBODIMENT 3)

T=1 CYCLE (8ms)
M⇒NORMAL PHASE SIGNAL: Vm=3.5V (OR 4.3V)
N⇒OPPOSITE PHASE SIGNAL: Vn=3.5V (OR 4.3V)

| P7E1 (0.4T) | 1E | 2E | 3E | 4E | 5E | 6E | 7E | 8E | 9E | 10E | 11E | 12E | Ec |
|---|---|---|---|---|---|---|---|---|---|---|---|---|---|
| | N | N | N | N | M | M | M | M | M | M | N | N | M |

| P7E2 (0.6T) | 1E | 2E | 3E | 4E | 5E | 6E | 7E | 8E | 9E | 10E | 11E | 12E | Ec |
|---|---|---|---|---|---|---|---|---|---|---|---|---|---|
| | N | N | N | M | M | M | M | M | M | M | M | N | M |

| P8E1 (0.4T) | 1E | 2E | 3E | 4E | 5E | 6E | 7E | 8E | 9E | 10E | 11E | 12E | Ec |
|---|---|---|---|---|---|---|---|---|---|---|---|---|---|
| | N | N | N | N | N | M | M | M | M | M | N | M | M |

| P8E2 (0.6T) | 1E | 2E | 3E | 4E | 5E | 6E | 7E | 8E | 9E | 10E | 11E | 12E | Ec |
|---|---|---|---|---|---|---|---|---|---|---|---|---|---|
| | N | N | N | N | M | M | M | M | M | M | M | M | M |

| P9E1 (0.4T) | 1E | 2E | 3E | 4E | 5E | 6E | 7E | 8E | 9E | 10E | 11E | 12E | Ec |
|---|---|---|---|---|---|---|---|---|---|---|---|---|---|
| | N | N | N | N | N | N | M | M | M | M | M | M | M |

| P9E2 (0.6T) | 1E | 2E | 3E | 4E | 5E | 6E | 7E | 8E | 9E | 10E | 11E | 12E | Ec |
|---|---|---|---|---|---|---|---|---|---|---|---|---|---|
| | M | N | N | N | N | M | M | M | M | M | M | M | M |

| P10E1 (0.4T) | 1E | 2E | 3E | 4E | 5E | 6E | 7E | 8E | 9E | 10E | 11E | 12E | Ec |
|---|---|---|---|---|---|---|---|---|---|---|---|---|---|
| | M | N | N | N | N | N | N | M | M | M | M | M | M |

| P10E2 (0.6T) | 1E | 2E | 3E | 4E | 5E | 6E | 7E | 8E | 9E | 10E | 11E | 12E | Ec |
|---|---|---|---|---|---|---|---|---|---|---|---|---|---|
| | M | M | N | N | N | N | M | M | M | M | M | M | M |

| P11E1 (0.4T) | 1E | 2E | 3E | 4E | 5E | 6E | 7E | 8E | 9E | 10E | 11E | 12E | Ec |
|---|---|---|---|---|---|---|---|---|---|---|---|---|---|
| | M | M | N | N | N | N | N | N | M | M | M | M | M |

| P11E2 (0.6T) | 1E | 2E | 3E | 4E | 5E | 6E | 7E | 8E | 9E | 10E | 11E | 12E | Ec |
|---|---|---|---|---|---|---|---|---|---|---|---|---|---|
| | M | M | M | N | N | N | N | M | M | M | M | M | M |

| P12E1 (0.4T) | 1E | 2E | 3E | 4E | 5E | 6E | 7E | 8E | 9E | 10E | 11E | 12E | Ec |
|---|---|---|---|---|---|---|---|---|---|---|---|---|---|
| | M | M | M | N | N | N | N | N | N | M | M | M | M |

| P12E2 (0.6T) | 1E | 2E | 3E | 4E | 5E | 6E | 7E | 8E | 9E | 10E | 11E | 12E | Ec |
|---|---|---|---|---|---|---|---|---|---|---|---|---|---|
| | M | M | M | M | N | N | N | N | M | M | M | M | M |

FIG. 30

ELECTRODE DRIVING PATTERNS FOR EACH TERM AT VIEWING POSITIONS 0.5 TO 4 (EMBODIMENT 4)
*=TIME DIVISION
T=1 CYCLE(8ms)  M⇒NORMAL PHASE SIGNAL:Vm=3.5V(OR 4.3V)  N⇒OPPOSITE PHASE SIGNAL:Vn=3.5V(OR 4.3V)

| | 1E | 2E | 3E | 4E | 5E | 6E | 7E | 8E | 9E | 10E | 11E | 12E | Ec |
|---|---|---|---|---|---|---|---|---|---|---|---|---|---|
| P0.5E1 (0.5T)* | M | M | M | N | N | N | N | N | N | M | M | M | M |
| P0.5E2 (0.5T)* | M | M | M | M | N | N | N | N | N | N | M | M | M |
| P1E1 (0.5T) | M | M | M | M | N | N | N | N | N | N | M | M | M |
| P1E2 (0.5T) | M | M | M | M | N | N | N | N | N | N | M | M | M |
| P1.5E1 (0.5T)* | M | M | M | M | N | N | N | N | N | N | M | M | M |
| P1.5E2 (0.5T)* | M | M | M | M | M | N | N | N | N | N | N | M | M |
| P2E1 (0.5T) | M | M | M | M | M | N | N | N | N | N | N | M | M |
| P2E2 (0.5T) | M | M | M | M | M | N | N | N | N | N | N | M | M |
| P2.5E1 (0.5T)* | M | M | M | M | M | N | N | N | N | N | N | M | M |
| P2.5E2 (0.5T)* | M | M | M | M | M | M | N | N | N | N | N | N | M |
| P3E1 (0.5T) | M | M | M | M | M | M | N | N | N | N | N | N | M |
| P3E2 (0.5T) | M | M | M | M | M | M | N | N | N | N | N | N | M |
| P3.5E1 (0.5T)* | M | M | M | M | M | M | N | N | N | N | N | N | M |
| P3.5E2 (0.5T)* | N | M | M | M | M | M | M | N | N | N | N | N | N |
| P4E1 (0.5T) | N | M | M | M | M | M | M | N | N | N | N | N | N |
| P4E2 (0.5T) | N | M | M | M | M | M | M | N | N | N | N | N | M |

FIG. 31

| ELECTRODE DRIVING PATTERNS FOR EACH TERM AT VIEWING POSITIONS 4.5 TO 8 (EMBODIMENT 4) |
|---|
| *=TIME DIVISION |
| T=1 CYCLE(8ms) M⇒NORMAL PHASE SIGNAL:Vm=3.5V(OR 4.3V) N⇒OPPOSITE PHASE SIGNAL:Vn=3.5V(OR 4.3V) |

| | 1E | 2E | 3E | 4E | 5E | 6E | 7E | 8E | 9E | 10E | 11E | 12E | Ec |
|---|---|---|---|---|---|---|---|---|---|---|---|---|---|
| P4.5E1 (0.5T)* | N | M | M | M | M | M | M | N | N | N | N | N | M |
| P4.5E2 (0.5T)* | N | N | M | M | M | M | M | M | N | N | N | N | M |
| P5E1 (0.5T) | N | N | M | M | M | M | M | M | N | N | N | N | M |
| P5E2 (0.5T) | N | N | M | M | M | M | M | M | N | N | N | N | M |
| P5.5E1 (0.5T)* | N | N | M | M | M | M | M | M | N | N | N | N | M |
| P5.5E2 (0.5T)* | N | N | N | M | M | M | M | M | N | N | N | N | M |
| P6E1 (0.5T) | N | N | N | M | M | M | M | M | N | N | N | N | M |
| P6E2 (0.5T) | N | N | N | M | M | M | M | M | N | N | N | N | M |
| P6.5E1 (0.5T)* | N | N | N | M | M | M | M | M | N | N | N | N | M |
| P6.5E2 (0.5T)* | N | N | N | N | M | M | M | M | M | N | N | N | M |
| P7E1 (0.5T) | N | N | N | N | M | M | M | M | M | N | N | N | M |
| P7E2 (0.5T) | N | N | N | N | M | M | M | M | M | N | N | N | M |
| P7.5E1 (0.5T)* | N | N | N | N | M | M | M | M | M | N | N | N | M |
| P7.5E2 (0.5T)* | N | N | N | N | N | M | M | M | M | M | N | N | M |
| P8E1 (0.5T) | N | N | N | N | N | M | M | M | M | M | N | N | M |
| P8E2 (0.5T) | N | N | N | N | N | M | M | M | M | M | N | M |

FIG. 32

| ELECTRODE DRIVING PATTERNS FOR EACH TERM AT VIEWING POSITIONS 8.5 TO 12 (EMBODIMENT 4) |||||||||||||
|---|---|---|---|---|---|---|---|---|---|---|---|---|
| *=TIME DIVISION |||||||||||||
| T=1 CYCLE(8ms)  M⇒NORMAL PHASE SIGNAL:Vm=3.5V(OR 4.3V)  N⇒OPPOSITE PHASE SIGNAL:Vn=3.5V(OR 4.3V) |||||||||||||

| | 1E | 2E | 3E | 4E | 5E | 6E | 7E | 8E | 9E | 10E | 11E | 12E | Ec |
|---|---|---|---|---|---|---|---|---|---|---|---|---|---|
| P8.5E1 (0.5T)* | N | N | N | N | N | M | M | M | M | M | M | N | M |
| P8.5E2 (0.5T)* | N | N | N | N | N | N | M | M | M | M | M | M | M |
| P9E1 (0.5T) | N | N | N | N | N | N | M | M | M | M | M | M | M |
| P9E2 (0.5T) | N | N | N | N | N | N | M | M | M | M | M | M | M |
| P9.5E1 (0.5T)* | N | N | N | N | N | N | M | M | M | M | M | M | M |
| P9.5E2 (0.5T)* | M | N | N | N | N | N | N | M | M | M | M | M | M |
| P10E1 (0.5T) | M | N | N | N | N | N | N | M | M | M | M | M | M |
| P10E2 (0.5T) | M | N | N | N | N | N | N | M | M | M | M | M | M |
| P10.5E1 (0.5T)* | M | N | N | N | N | N | N | M | M | M | M | M | M |
| P10.5E2 (0.5T)* | M | M | N | N | N | N | N | N | M | M | M | M | M |
| P11E1 (0.5T) | M | M | N | N | N | N | N | M | M | M | M | M | M |
| P11E2 (0.5T) | M | M | N | N | N | N | N | M | M | M | M | M | M |
| P11.5E1 (0.5T)* | M | M | N | N | N | N | N | N | M | M | M | M | M |
| P11.5E2 (0.5T)* | M | M | M | N | N | N | N | N | N | M | M | M | M |
| P12E1 (0.5T) | M | M | M | N | N | N | N | N | M | M | M | M | M |
| P12E2 (0.5T) | M | M | M | N | N | N | N | N | N | M | M | M | M |

DISPLAY DEVICE AND LIQUID CRYSTAL PANEL DRIVING METHOD

TECHNICAL FIELD

The present invention relates to a display device capable of three-dimensional displaying.

BACKGROUND ART

Patent Literature 1 discloses a method for a display device which includes a parallax barrier panel and is capable of three-dimensional displaying, the device having (i) a barrier region corresponding to barrier electrodes of the parallax barrier panel and (ii) a transmissive region corresponding to transmissive electrodes provided to either side of the barrier electrodes. In the method, the barrier region is caused to be black (a light-blocking state) at all times, and the transmissive region is caused to switch between black (the light-blocking state) and white (a transmissive state) on a time-divided basis.

CITATION LIST

Patent Literature

[Patent Literature 1]
Japanese Patent Application Publication Tokukai No. 2006-189766 (Publication date: Jul. 20, 2006)

SUMMARY OF INVENTION

Technical Problem

The above method has a problem that luminance is reduced during three-dimensional displaying because the transmissive region (slit) displays gray.

The present invention has been made in view of the above problems. An object of the present invention is to provide a display device capable of high-quality three-dimensional displaying.

Solution to Problem

In order to solve the above problem, a display device in accordance with an aspect of the present invention is a display device capable of three-dimensional displaying, including: a first liquid crystal panel configured to display an image; and a second liquid crystal panel configured to generate a parallax effect by use of a barrier in a light-blocking state and a slit in a light-transmitting state, the barrier and the slit being provided in an alternating manner along a first direction, in which during three-dimensional displaying for a viewing position β, in a first term, an entirety of a first predetermined region of the second liquid crystal panel takes on the light-blocking state and a first adjacent region, which is adjacent to the first predetermined region in the first direction, takes on the light-transmitting state, and in a second term, at least one of two side regions in the first predetermined region takes on the light-transmitting state, a remaining region of the first predetermined region takes on the light-blocking state, and at least part of the first adjacent region takes on the light-transmitting state.

With the above configuration, when viewed throughout both the first and second terms (throughout one cycle), the at least one of the two side regions displays gray (i.e., takes on a state between light transmitting and light blocking). This makes it possible to suppress a light concentration effect caused by the side regions and reduce changes in luminance (i.e., reduce flicker). Furthermore, because there is a region which is in a light-transmitting state throughout both the first and second terms (throughout one cycle), it is possible to secure the luminance of the display.

Advantageous Effects of Invention

An embodiment of the present invention enables high-quality three-dimensional displaying.

BRIEF DESCRIPTION OF DRAWINGS

FIG. 4 is a schematic diagram illustrating a configuration of the display device in accordance with the present embodiments.

FIG. 9 is a table illustrating an example of how the switching liquid crystal panel is driven (at viewing positions 1 through 6) in Embodiment 1.

FIG. 10 is a table illustrating an example of how the switching liquid crystal panel is driven (at viewing positions 7 through 12) in Embodiment 1.

FIG. 11 is a graph illustrating an effect (on change in luminance) of Embodiment 1.

FIG. 15 is a table illustrating an example of how the switching liquid crystal panel is driven (at viewing positions 0.5 through 4) in Embodiment 2.

FIG. 16 is a table illustrating an example of how the switching liquid crystal panel is driven (at viewing positions 4.5 through 8) in Embodiment 2.

FIG. 17 is a table illustrating an example of how the switching liquid crystal panel is driven (at viewing positions 8.5 through 12) in Embodiment 2.

FIG. 18 is a graph illustrating an effect (on crosstalk and change in luminance) of Embodiment 2.

FIG. 22 is a table illustrating an example of how the switching liquid crystal panel is driven (at viewing positions 1 through 6) in Embodiment 3.

FIG. 23 is a table illustrating an example of how the switching liquid crystal panel is driven (at viewing positions 7 through 12) in Embodiment 3.

FIG. 30 is a table illustrating an example of how the switching liquid crystal panel is driven (at viewing positions 0.5 through 4) in Embodiment 4.

FIG. 31 is a table illustrating an example of how the switching liquid crystal panel is driven (at viewing positions 4.5 through 8) in Embodiment 4.

FIG. 32 is a table illustrating an example of how the switching liquid crystal panel is driven (at viewing positions 8.5 through 12) in Embodiment 4.

DESCRIPTION OF EMBODIMENTS (Flicker in Parallax-Barrier-Type 3D Display Device)

Figure 1:
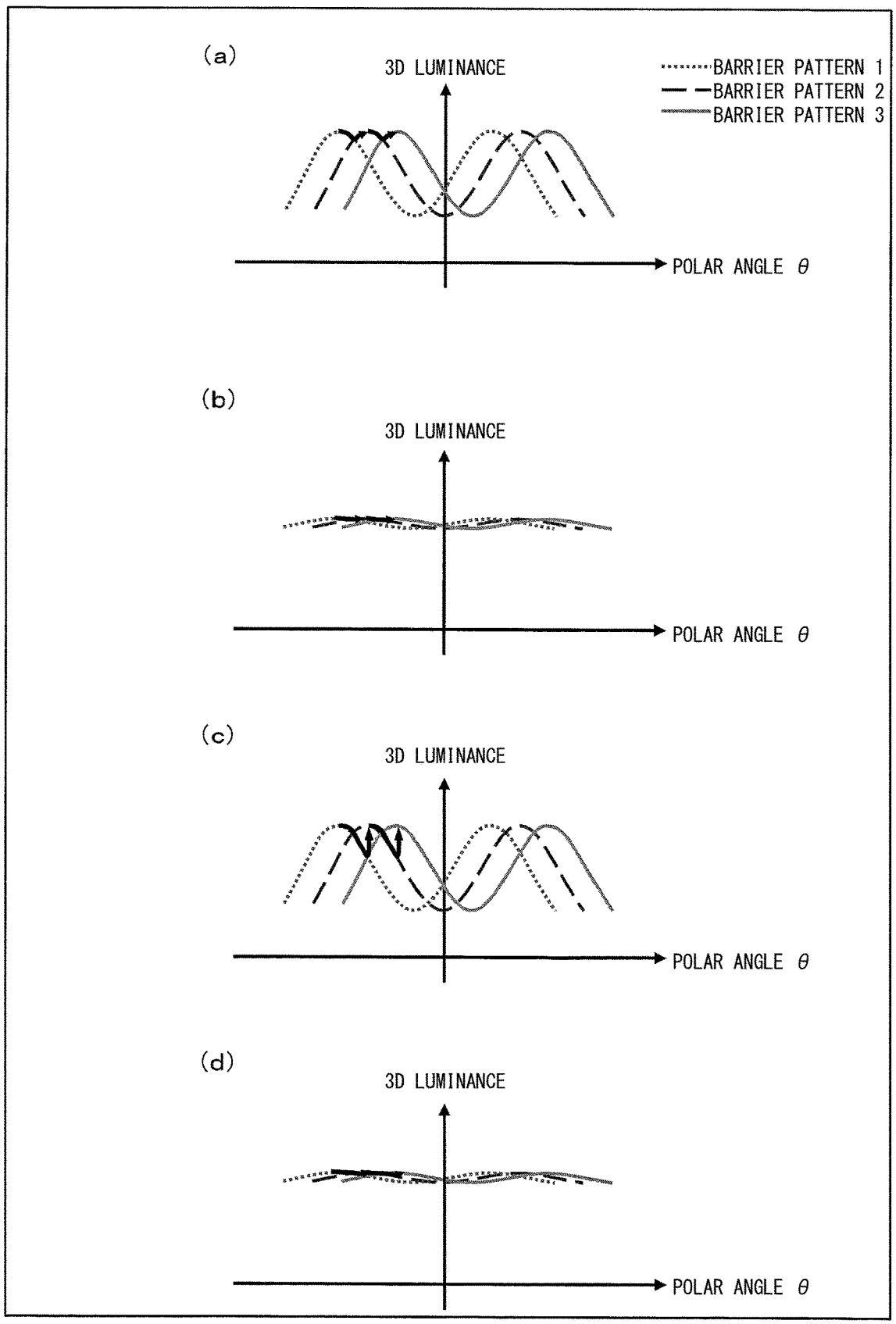
FIG. 1 is a diagram for explaining flicker during tracking.

A 3D (three-dimensional) display device having a front barrier structure, in which the parallax barrier is provided on a viewer side, exhibits little crosstalk but exhibits a large change in luminance (i.e., flicker) due to a light concentration effect and a diffraction effect caused by barrier edges. In a tracking system, the barrier pattern of a switching liquid crystal panel changes in accordance with movement of the viewer's face. However, this causes a large change in 3D luminance (luminance during 3D displaying) with respect to a polar angle θ for each barrier pattern. As a result, even with a small amount of latency (time from face sensing to completion of barrier pattern switching), the viewer will perceive flicker (a medium amount of perceived flicker), as illustrated in (a) of FIG. 1. It is ideal to minimize the change in 3D luminance with respect to the polar angle θ for each barrier pattern and to minimize latency. In such a case, perception of flicker is reduced (a small amount of perceived flicker), as shown in (b) of FIG. 1. With conventional techniques, there is a large change in 3D luminance with respect to the polar angle θ for each barrier pattern and a large amount of latency. This causes a considerable amount of perceived flicker (a large amount of perceived flicker), as shown in (c) of FIG. 1. However, if the change in 3D luminance with respect to the polar angle θ for each barrier pattern is reduced (if the change is made flatter), then it is possible to reduce the perceived flicker even if there is a certain amount of latency (a small amount of perceived flicker), as shown in (d) of FIG. 1.

(Overview of Display Device in Accordance with the Present Embodiments)

Figure 2:
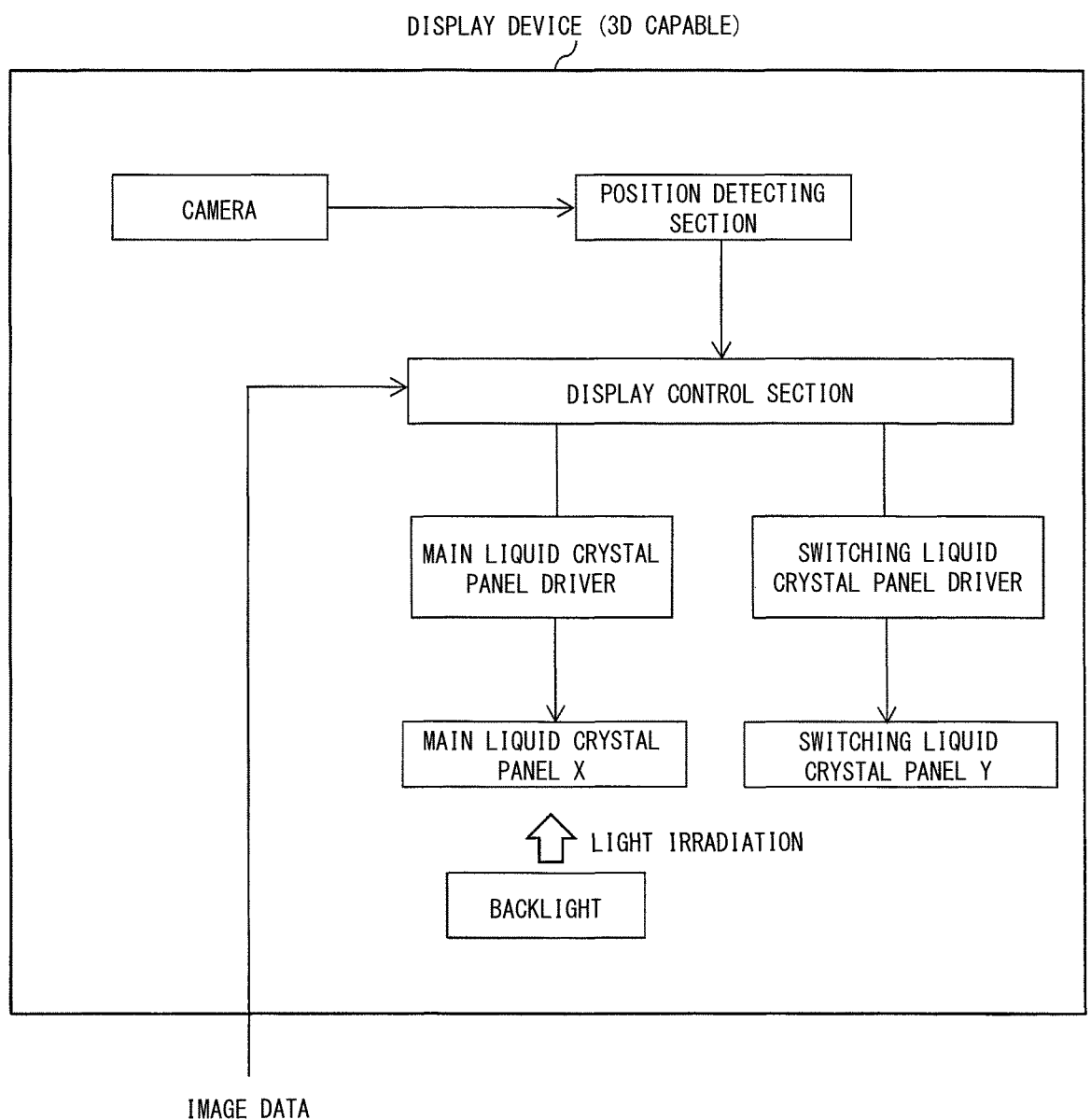
FIG. 2 is a block diagram schematically illustrating a display device in accordance with the present embodiments.

The present display device is a 3D display device which employs a parallax barrier (front barrier structure) and a tracking system. As illustrated in FIG. 2, the display device includes: a camera; a main liquid crystal panel X (first liquid crystal panel); a switching liquid crystal panel Y (second liquid crystal panel) configured to form a parallax barrier; a main liquid crystal panel driver configured to drive the main liquid crystal panel X; a switching liquid crystal panel driver configured to drive the switching liquid crystal panel Y; a backlight configured to illuminate the main liquid crystal panel X; a position detecting section configured to detect a position of the viewer's face; and a display control section configured to control the main liquid crystal panel driver and the switching liquid crystal panel driver in accordance with (i) an image signal and (ii) output from the position detecting section.

In the present display device, the switching liquid crystal panel enables switching between two-dimensional displaying and three-dimensional displaying. During two-dimensional displaying, the entirety of the switching liquid crystal panel takes on a light-transmitting state (i.e., a state of being white or having a transmissivity equivalent to white). During three-dimensional displaying, a parallax effect is generated by forming, in the switching liquid crystal panel, (i) a barrier taking on a light-blocking state (i.e., a state of being black or having a transmissivity equivalent to black) and (ii) slits taking on a light-transmitting state (i.e., a state of being white or having an equivalent transmissivity).

FIG. 2 is a flow chart of a process relating to the switching liquid crystal panel during three-dimensional displaying. First, the position detecting section acquires, from the camera, an image of the viewer's face (step S1) and then calculates, from the image, positional information about the face (step S2). Next, the display control section determines a barrier pattern, for the switching liquid crystal panel Y, in accordance with the positional information (step S3) and then controls the switching liquid crystal panel driver in accordance with the barrier pattern thus determined (step S4). The switching liquid crystal panel Y is thus driven (step S5). The above functions of the position detecting section and the display control section can be realized by, for example, a processor executing a predetermined program.

FIG. 4 illustrates a specific example of the present display device. As illustrated in FIG. 4, the present display device includes the following (in this order, starting from a backlight side): a polarizing plate H (backlight side); a substrate A (active matrix substrate); a liquid crystal layer Ux; a substrate C (color filter substrate); a polarizing plate J; an adhesive layer Z; a substrate D (segment substrate); a liquid crystal layer Uy; a substrate F (counter substrate); and a polarizing plate K (viewer side). The substrate A, the liquid crystal layer Ux, and the substrate C constitute the main liquid crystal panel X. The substrate D, the liquid crystal layer Uy, and the substrate F constitute the switching liquid crystal panel Y.

In this specific example, normally white TN liquid crystals are used for the liquid crystal layer Uy of the switching liquid crystal panel Y. The number of pixels in the main liquid crystal panel X is 5760 pixels in a horizontal direction by 1080 pixels in a vertical direction. Each pixel includes a red subpixel, a green subpixel, and a blue subpixel, which are arranged along the vertical direction. Sizes can be, for example, as follows: polarizing plate H: 0.21 mm; substrate A: 0.3 mm; substrate C: 0.3 mm; polarizing plate J: 0.21 mm; adhesive layer Z: 0.05 mm; substrate D: 0.3 mm; substrate F: 0.3 mm; and polarizing plate K: 0.21 mm.

Not that the main liquid crystal panel X is not limited to being a liquid crystal panel. For example, the main liquid crystal panel X may instead be an organic EL panel. It is also possible to provide the switching liquid crystal panel Y on a backlight side of the main liquid crystal panel X.

Embodiment 1

Figure 5:
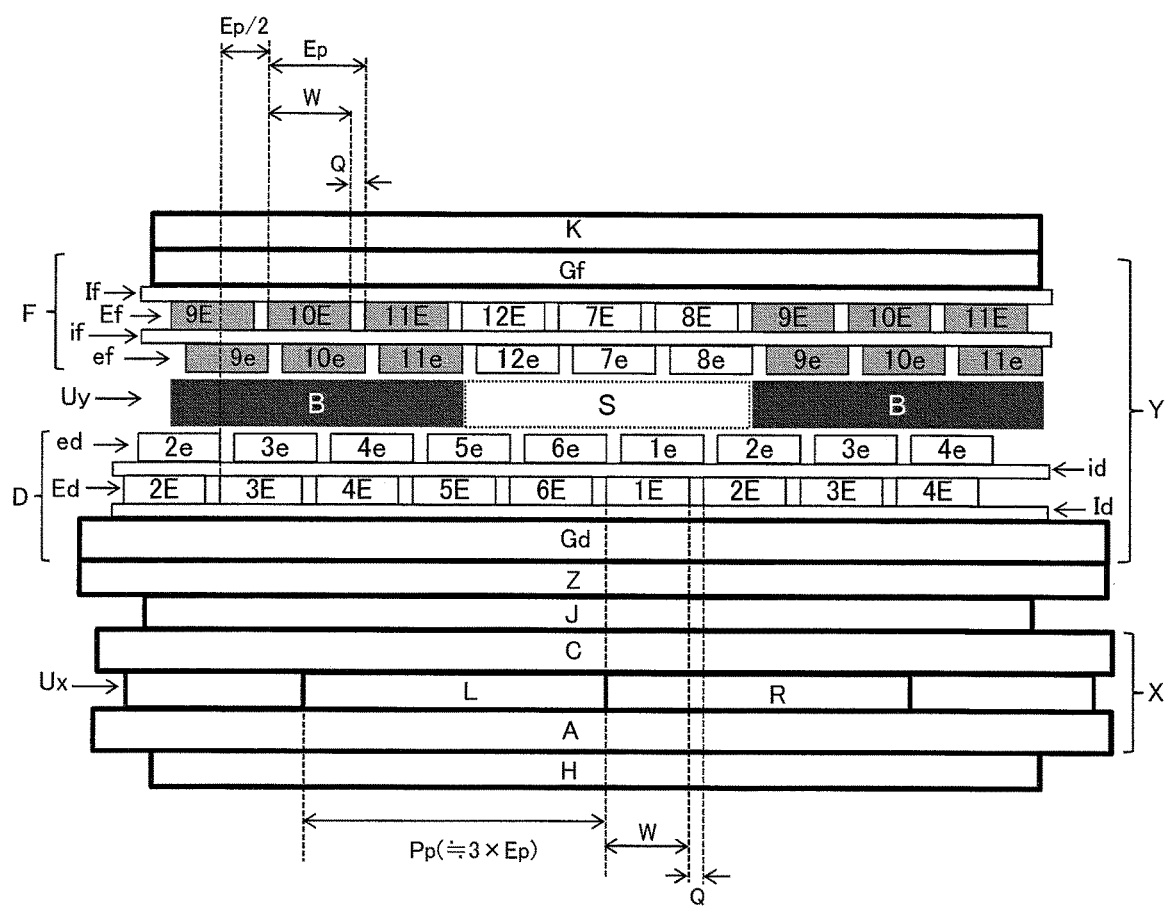
FIG. 5 is a schematic diagram illustrating an example configuration of a display device in accordance with Embodiment 1.

As illustrated in FIG. 5, in Embodiment 1, the substrate D (segment substrate) includes, in this order, a glass substrate Gd, an insulating film Id, a segment main electrode layer Ed, an insulating film id, and a segment auxiliary electrode layer ed.

The segment main electrode layer Ed includes a plurality of groups, each of which is constituted by a plurality of segment main electrodes. In each one of the plurality of groups, six segment main electrodes 1E through 6E (each having a width W) are arranged in this order along the horizontal direction, such that each adjacent pair of segment main electrodes have a gap Q therebetween (electrode pitch Ep=W+Q). The segment auxiliary electrode layer ed includes a plurality of groups, each of which is constituted by a plurality of segment auxiliary electrodes. In each one of the plurality of groups, six segment auxiliary electrodes 1e through 6e (each having the width W and being the same size as the segment main electrodes) are arranged in this order along the horizontal direction, such that each adjacent pair of segment auxiliary electrodes have a gap Q therebetween (electrode pitch Ep=W+Q). The n-th group (n: a natural number) of segment main electrodes and the n-th group of segment auxiliary electrodes are positionally offset from each other in the horizontal direction by an offset amount equal to the gap Q. For example, the horizontal position of the segment main electrode 1E and the horizontal position of the segment auxiliary electrode 1e are offset (in a rightward direction, as seen in the drawing) by an offset amount equal to the gap Q. Furthermore, each segment main electrode of the n-th group of segment main electrodes is electrically connected to a corresponding segment auxiliary electrode of the n-th group of segment auxiliary electrodes. For example, the segment main electrode 1E is electrically connected to the segment auxiliary electrode 1e. In the present example, the number of segment main electrodes and segment auxiliary electrodes in each group is six, but the number of electrodes is not limited to this example.

As illustrated in FIG. 5, in Embodiment 1, the substrate F (counter substrate) includes, in this order, a glass substrate Gf, an insulating film If, a main counter electrode layer Ef, an insulating film if, and an auxiliary counter electrode layer ef. The main counter electrode layer Ef includes a plurality of groups, each of which is constituted by a plurality of main counter electrodes. In each one of the plurality of groups, six main counter electrodes 7E through 12E (each having the width W and being the same size as the segment main electrodes) are arranged in this order along the horizontal direction, such that each adjacent pair of main counter electrodes have a gap Q therebetween (electrode pitch Ep=W+Q). The auxiliary counter electrode layer ef includes a plurality of groups, each of which is constituted by a plurality of auxiliary counter electrodes. In each one of the plurality of groups, six auxiliary counter electrodes 7e through 12e (each having the width W and being the same size as the segment main electrodes) are arranged in this order along the horizontal direction, such that each adjacent pair of auxiliary counter electrodes have a gap Q therebetween (electrode pitch Ep=W+Q). The n-th group (n: a natural number) of main counter electrodes and the n-th group of auxiliary counter electrodes are positionally offset from each other in the horizontal direction (in a rightward direction, as seen in the drawing) by an offset amount equal to the gap Q. For example, the horizontal position of the main counter electrode 7E and the horizontal position of the auxiliary counter electrode 7e are offset by an offset amount equal to the gap Q. Furthermore, each main counter electrode of the n-th group of main counter electrodes is electrically connected to a corresponding auxiliary counter electrode of the n-th group of auxiliary counter electrodes. For example, the main counter electrode 7E is electrically connected to the auxiliary counter electrode 7e. In the present example, the number of main counter electrodes and auxiliary counter electrodes in each group is six, but the number of electrodes is not limited to this example.

Furthermore, the n-th group (n: a natural number) in the segment main electrode layer Ed and the n-th group in the main counter electrode layer Ef are positionally offset from each other in the horizontal direction by an offset amount equal to half the electrode pitch (Ep/2). In other words, in each of the following pairs, the horizontal position of the electrode mentioned first is offset in a leftward direction (as seen in the figure) from the horizontal position of the electrode mentioned second, by an offset amount equal to half the electrode pitch: the main counter electrode 7E and the segment main electrode 1E; the main counter electrode 8E and the segment main electrode 2E; the main counter electrode 9E and the segment main electrode 3E; the main counter electrode 10E and the segment main electrode 4E; the main counter electrode 11E and the segment main electrode 5E; and the main counter electrode 12E and the segment main electrode 6E.

In FIG. 5, the electrode pitch Ep is approximately 16.9 µm, the width W of each electrode is approximately 11.9 µm, and the gap Q between each electrode is 5 µm. Furthermore, the liquid crystal layer Uy (normally white TN liquid crystals), which is sandwiched by the segment substrate D and the counter substrate F, has as cell thickness of 4.6 µm, a birefringent index of 0.11, and retardation of 506 nm. Note that with the main liquid crystal panel X, a pixel L, which displays an image for the left eye, and a pixel R, which displays an image for the right eye, are provided in an alternating manner in the horizontal direction (a rightward direction, as seen in the figure). The pixel pitch Pp is 50.7 µm (approximately 3×Ep).

With regards to the switching liquid crystal panel V illustrated in FIG. 5, by supplying signals to the main counter electrodes 9E through 11E, the main counter electrodes 12E, 7E, and 8E, and the segment main electrodes 1E through 6E such that, for example, the phase of (i) the signal supplied to the main counter electrodes 9E through 11E is opposite to the phase of GO the signal supplied to the main counter electrodes 12E, 7E, and 8E and the segment main electrodes 1E through 6E, it is possible to cause a region corresponding to 9E through 11E and 9e through 11e to become a barrier in a light-blocking state B, and cause a region corresponding to 12E, 7E, 8E, 12e, 7e, and 8e to become a slit in a light-transmitting state S.

Figure 6:
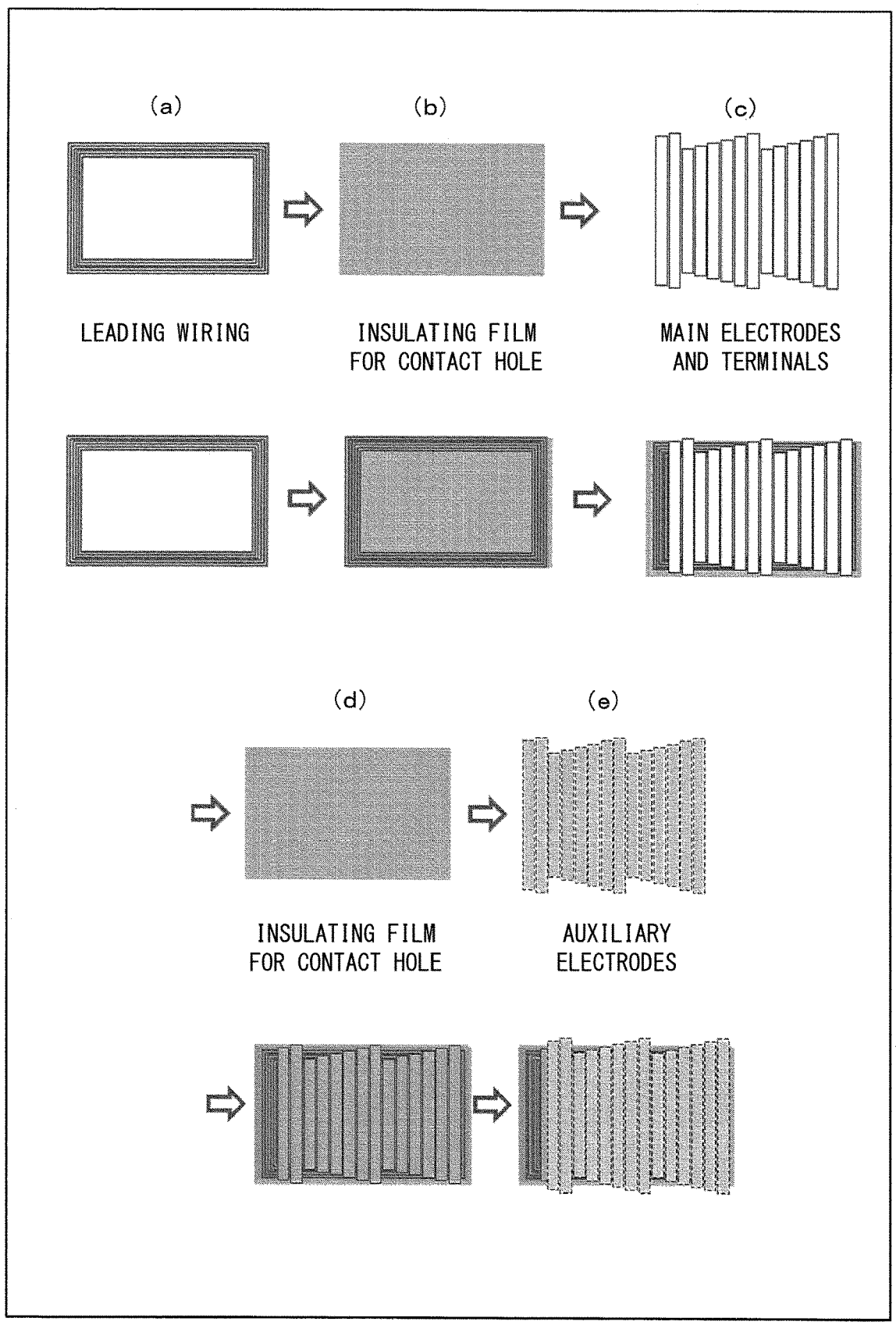
FIG. 6 is a schematic diagram illustrating steps for producing a switching liquid crystal panel of the display device in accordance with Embodiment 1.

As illustrated in FIG. 6, the segment substrate D is configured such that: leading wiring is formed on the glass substrate Gd ((a) of FIG. 6); the insulating film Id for a contact hole is formed from SiN on the leading wiring ((b) of FIG. 6); thereafter, the segment main electrodes 1E through 6E and terminals are formed on the insulating film Id from a light transmissive metal such as ITO ((c) of FIG. 6); the insulating film id for the contact hole is formed from SiN on the segment main electrodes ((d) of FIG. 6); and, subsequently, the segment auxiliary electrodes 1e through 6e are formed on the insulating film id from a light transmissive metal such as ITO ((e) of FIG. 6). Although not illustrated, an alignment film is formed on the segment auxiliary electrodes 1e through 7e.

As illustrated in FIG. 6, the counter substrate F is configured such that: leading wiring is formed on the glass substrate Gf ((a) of FIG. 6); the insulating film If for a contact hole is formed from SiN on the leading wiring ((b) of FIG. 6); thereafter, the main counter electrodes 7E through 12E and terminals are formed on the insulating film If from a light transmissive metal such as ITO ((c) of FIG. 6); the insulating film if for the contact hole is formed from SiN on the main counter electrodes ((d) of FIG. 6); and, subsequently, the auxiliary counter electrodes 7e through 12e are formed on the insulating film if from a light transmissive metal such as ITO ((e) of FIG. 6). Although not illustrated, an alignment film is formed on the auxiliary counter electrodes 7e through 12e.

Figure 3:
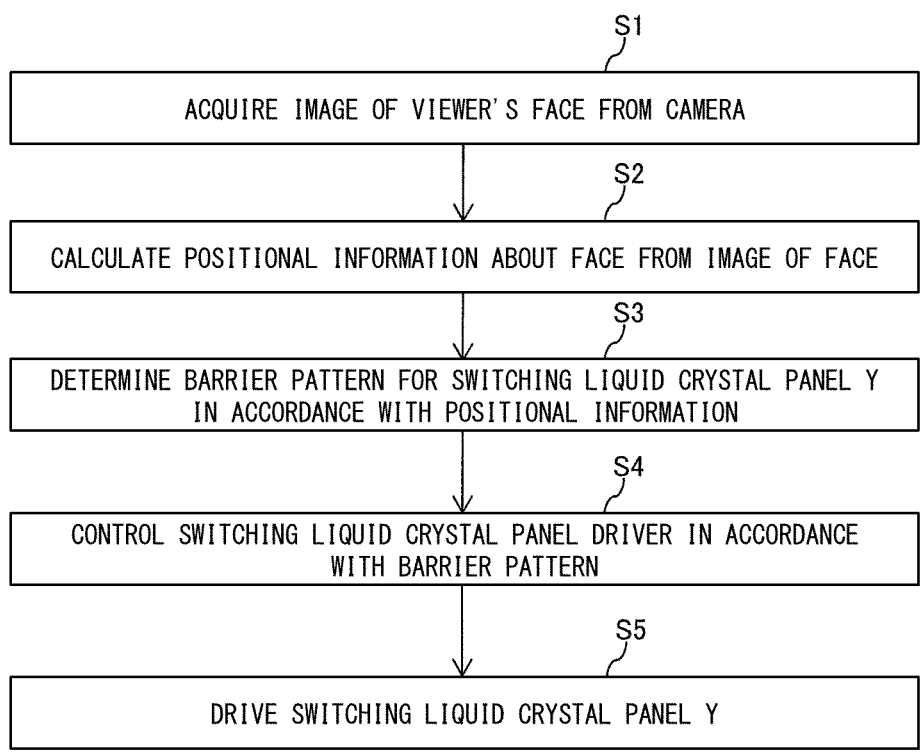
FIG. 3 is a flowchart illustrating a flow of a process carried out by the display device in accordance with the present embodiments.

In a tracking system, the barrier pattern of the switching liquid crystal panel Y is changed in accordance with the position of the viewer's face. In the following description, the position of the viewer's face, as obtained in step 2 of FIG. 3, is referred to as a "viewing position". The following description will discuss, with regards to three-dimensional displaying, barrier patterns corresponding to a viewing position 1 through a viewing position 12, as well as electrode driving patterns for realizing these barrier patterns.

In Embodiment 1, for each of the viewing position 1 through the viewing position 12, a barrier pattern is changed so as to differ between a first term and a second term in one cycle. The viewing position 1 through the viewing position 12 are aligned in this order along the horizontal direction (in a rightward direction, as seen in the drawing).

Figure 7:
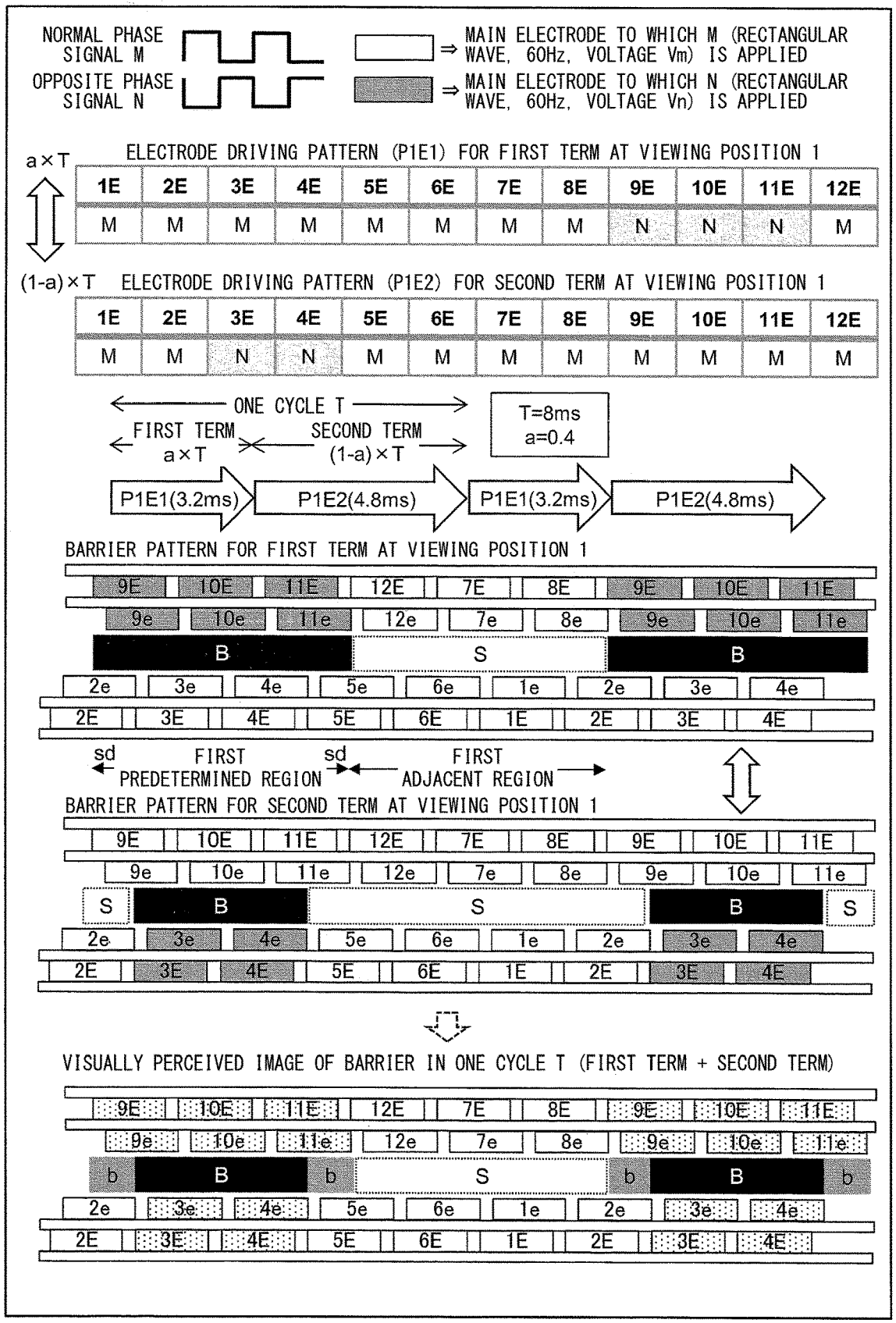
FIG. 7 is a diagram for explaining an example of how the switching liquid crystal panel is driven (at a viewing position 1) in Embodiment 1.

Specifically, the electrode driving patterns (P1E1 and P1E2) for the first and second terms at viewing position 1 are as follows, as illustrated in FIG. 7. In the first term at the viewing position 1, a normal phase signal M (rectangular wave, 60 Hz, voltage Vm) is supplied to the segment main electrodes 1E through 6E and the main counter electrodes 7E, 8E, and 12E, and an opposite phase signal N (rectangular wave, 60 Hz, voltage Vn) is supplied to the main counter electrodes 9E through 11E. In the second term at the viewing position 1, the normal phase signal M is supplied to the segment main electrodes 1E, 2E, 5E, and 6E and the main counter electrodes 7E through 12E, and the opposite phase signal N is supplied to the segment main electrodes 3E and 4E. Note that one cycle is represented as T, the first term is represented as a×T, and the second term is represented as (1−a)×T, where 0<a<1. Here, T=8 ms and a=0.4.

With the above electrode driving patterns, in the first term, the entirety of a first predetermined region (a region corresponding to 9E through 11E and 9e through 11e) of the switching liquid crystal panel Y becomes a barrier in a light-blocking state B, and a first adjacent region (a region corresponding to 12E, 7E, 8E, 12e, 7e, and 8e) which is adjacent to the first predetermined region in the horizontal direction becomes a slit in a light-transmitting state S. In the second term, two side regions sd in the first predetermined region take on a light-transmitting state S, a remaining region (a region corresponding to 3E, 4E, 3e, and 4e) in the first predetermined region becomes a barrier in a light-blocking state B, and the entirety of the first adjacent region takes on a light-transmitting state S.

In this way, by dividing one cycle into first and second terms and by causing the barrier to be narrower and the slit to be wider in the second term than in the first term, it is possible to cause, in one cycle T, the first predetermined region to have (i) two side regions in a gray state b (a state between light blocking and light transmitting) and (ii) a remaining region (the region sandwiched between the two side regions) in a light-blocking state B.

This makes it possible to suppress the light concentration effect caused by the side regions and reduce changes in luminance (i.e., reduce flicker). Furthermore, because there is a region (first adjacent region) which is in a light-transmitting state throughout both the first and second terms (throughout one cycle), it is possible to secure the luminance of the display.

Figure 8:
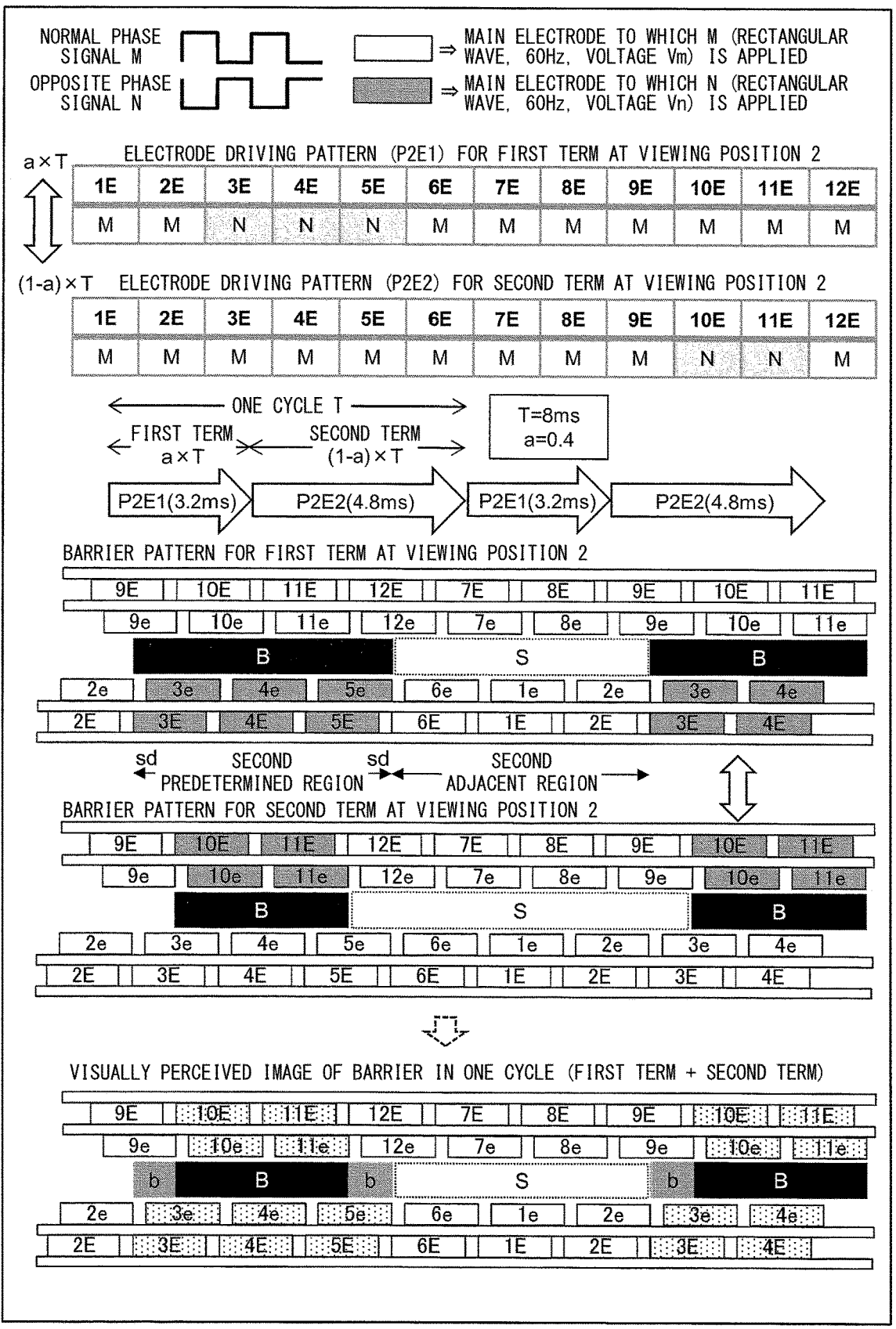
FIG. 8 is a diagram for explaining an example of how the switching liquid crystal panel is driven (at a viewing position 2) in Embodiment 1.

With the present display device, electrode driving patterns (P2E1 and P2E2) for the first and second terms at viewing position 2 are as follows, as illustrated in FIG. 8. In the first term at the viewing position 2, a normal phase signal M (rectangular wave, 60 Hz, voltage Vm) is supplied to the segment main electrodes 1E, 2E, and 6E and the main counter electrodes 7E through 12E, and an opposite phase signal N (rectangular wave, 60 Hz, voltage Vn) is supplied to the segment main electrodes 3E through 5E. In the second term at the viewing position 2, the normal phase signal M is supplied to the segment main electrodes 1E through 6E and the main counter electrodes 7E through 9E and 12E, and the opposite phase signal N is supplied to the main counter electrodes 10E and 11E. Note that one cycle is represented as T, the first term is represented as a×T, and the second term is represented as (1−a)×T, where 0<a<1. Here, T=8 ms and a=0.4.

With the above electrode driving patterns, in the first term, the entirety of a second predetermined region (a region which corresponds to 3E through 5E and 3e through 5e and which is offset from the first predetermined region of FIG. 7 by an offset amount equal to half the electrode pitch (Ep/2) in the direction of movement of viewing position) becomes a barrier in a light-blocking state B, and a second adjacent region (a region corresponding to 6E, 1E, 2E, 6e, 1e, and 2e) which is adjacent to the second predetermined region in the horizontal direction becomes a slit in a light-transmitting state S. In the second term, two side regions sd in the second predetermined region take on a light-transmitting state S, a remaining region (a region corresponding to 10E, 11E, 10e, and 11e) in the second predetermined region becomes a barrier in a light-blocking state B, and the entirety of the second adjacent region takes on a light-transmitting state S.

In this way, by dividing one cycle into first and second terms and by causing the barrier to be narrower and the slit to be wider in the second term than in the first term, it is possible to cause, in one cycle T, the second predetermined region to have (i) two side regions in a gray state b (a state between light blocking and light transmitting) and (ii) a remaining region (the region sandwiched between the two side regions) in a light-blocking state B.

This makes it possible to suppress the light concentration effect caused by the side regions and reduce changes in luminance (i.e., reduce flicker). Furthermore, because there is a region (second adjacent region) which is in a light-transmitting state throughout both the first and second terms (throughout one cycle), it is possible to secure the luminance of the display.

For the viewing position 3, electrode driving patterns P3E1/P3E2 illustrated in FIG. 9 can be used; for the viewing position 4, electrode driving patterns P4E1/P4E2 illustrated in FIG. 9 can be used; for the viewing position 5, electrode driving patterns P5E1/P5E2 illustrated in FIG. 9 can be used; for the viewing position 6, electrode driving patterns P6E1/P6E2 illustrated in FIG. 9 can be used; for the viewing position 7, electrode driving patterns P7E1/P7E2 illustrated in FIG. 10 can be used; for the viewing position 8, electrode driving patterns P8E1/P8E2 illustrated in FIG. 10 can be used; for the viewing position 9, electrode driving patterns P9E1/P9E2 illustrated in FIG. 10 can be used; for the viewing position 10, electrode driving patterns P10E1/P10E2 illustrated in FIG. 10 can be used; for the viewing position 11, electrode driving patterns P11E1/P11E2 illustrated in FIG. 10 can be used; and for the viewing position 12, electrode driving patterns P12E1/P12E2 illustrated in FIG. 10 can be used.

With Embodiment 1, in a case where a=0.4 and Vn=Vm=3.5 V, it is possible to achieve the change in luminance shown in g1 of FIG. 11 (a luminance change ratio of 10%), and in a case where a=0.4 and Vn=Vm=4.3 V, it is possible to achieve the change in luminance shown in g2 of FIG. 11 (a luminance change ratio of 33%). In a reference embodiment (a=1; Vn=Vm=3.5 V) in which barrier width is not changed throughout one cycle, the change in luminance is as shown in g3 (a luminance change ratio of 63%). Thus, the luminance change ratio is greatly decreased in Embodiment 1. In FIG. 11, the luminance change ratio is found by (i) determining luminance for right eye and luminance for left eye with respect to the polar angle when the pixel L for the left eye and the pixel R for the right eye are both displaying white, and then (ii) using the following formula: (maximum value of total luminance for both eyes)−(minimum value of total luminance for both eyes)/(maximum value of total luminance for both eyes).

Figure 12:
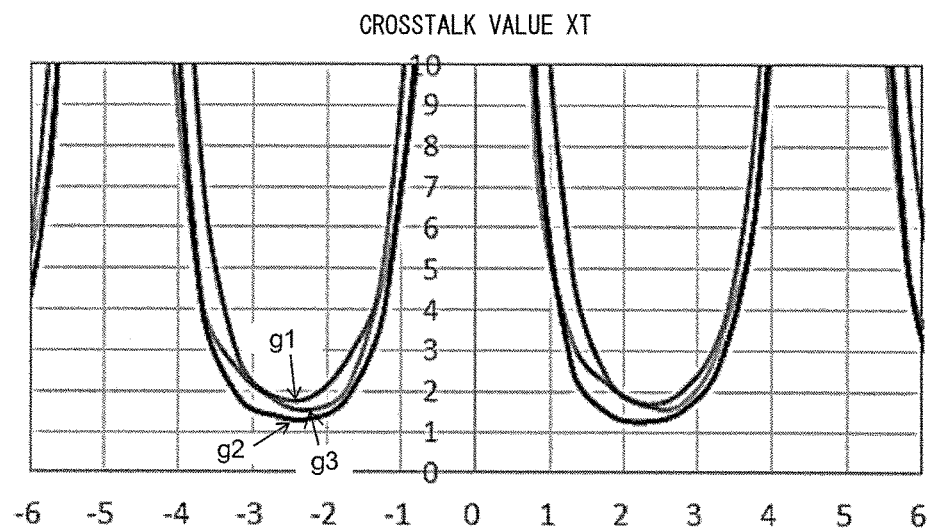
FIG. 12 is a graph illustrating an effect (on crosstalk) of Embodiment 1.

Furthermore, with Embodiment 1, in a case where a=0.4 and Vn=Vm=3.5 V, it is possible to achieve the crosstalk value XT shown in g1 of FIG. 12 (a minimum value of 1.8), and in a case where a=0.4 and Vn=Vm=4.3 V, it is possible to achieve the crosstalk value XT shown in g2 of FIG. 12 (a minimum value of 1.3). For comparison, in a reference embodiment (a=1; Vn=Vm=3.5 V) in which barrier width is not changed throughout one cycle, the crosstalk value XT is as shown in g3 of FIG. 12 (a minimum value of 1.6).

Figure 13:
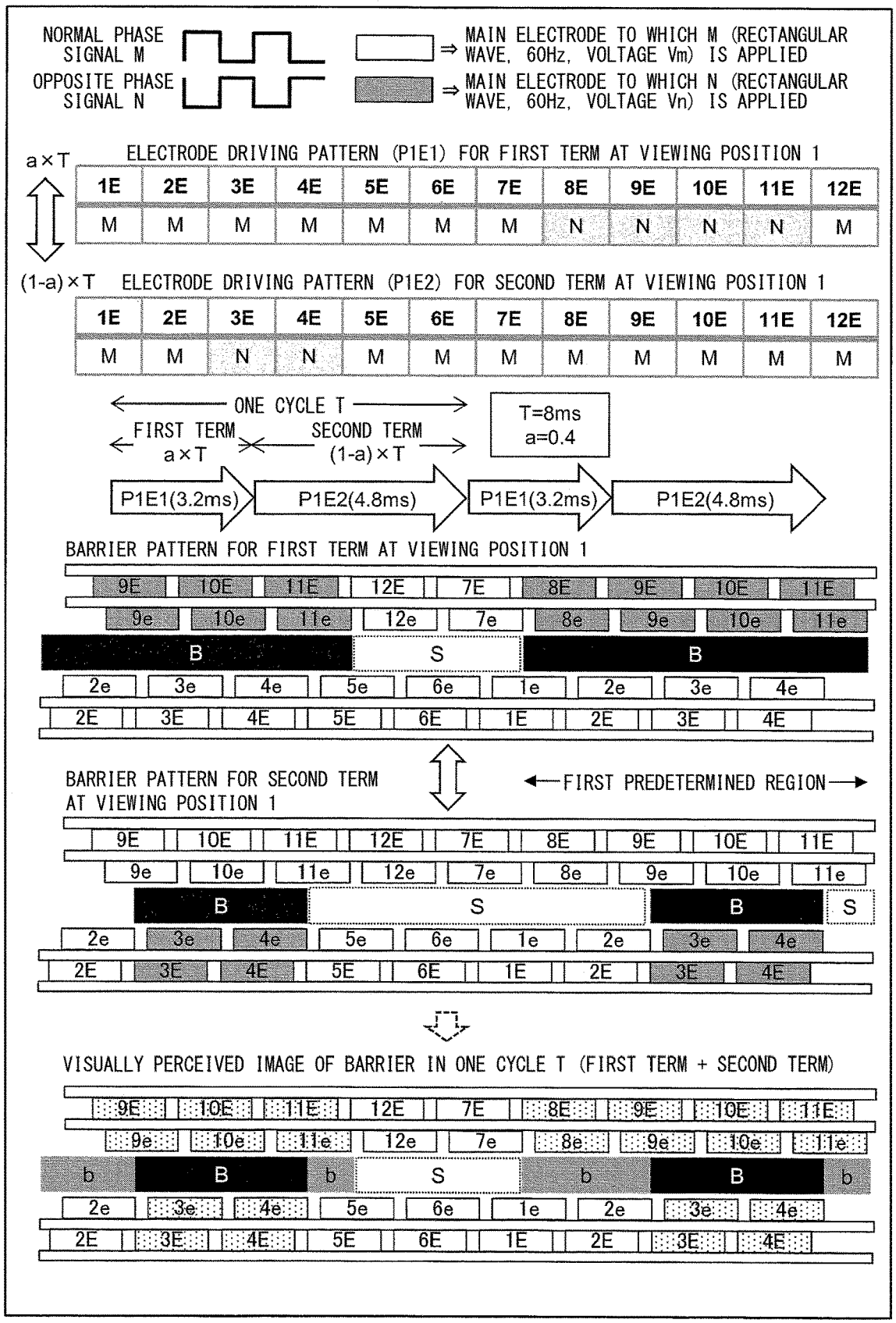
FIG. 13 is a diagram for explaining another example of how the switching liquid crystal panel is driven (at the viewing position 1) in Embodiment 1.

With electrode driving patterns for viewing position 1 as illustrated in FIG. 13, in the first term, the entirety of a first predetermined region (a region corresponding to 8E through 11E and 8*e* through 11*e*) becomes a barrier in a light-blocking state B, and a first adjacent region (a region corresponding to 12E, 7E, 12*e*, and 7*e*) which is adjacent to the first predetermined region in the horizontal direction becomes a slit in a light-transmitting state S. In the second term, two side regions sd in the first predetermined region take on a light-transmitting state S, a remaining region (a region corresponding to 3E, 4E, 3*e*, and 4*e*) in the first predetermined region becomes a barrier in a light-blocking state B, and the entirety of the first adjacent region takes on a light-transmitting state S.

This makes it possible to cause, in one cycle T, the first predetermined region to have (i) two side regions which are both in a gray state b (a state between light blocking and light transmitting) but have differing widths and (ii) a remaining region (the region sandwiched between the two side regions) in a light-blocking state B.

Embodiment 21

Embodiment 2 uses a switching liquid crystal panel Y which is structurally identical to that of Embodiment 1. With regards to three-dimensional displaying, in Embodiment 2, for each of a viewing position 1 through a viewing position 12, a barrier pattern remains unchanged throughout one cycle (i.e., driving is not altered on a time-divided basis). However, for a viewing position between (i) a viewing position n (n=1 . . . 11) and (ii) a viewing position (n+1), the barrier pattern is changed so as to differ between a first term and a second term in one cycle (i.e., driving is altered on a time-divided basis). The viewing position 1 through the viewing position 12 are aligned in this order along the horizontal direction (in a rightward direction, as seen in the drawing).

Figure 14:
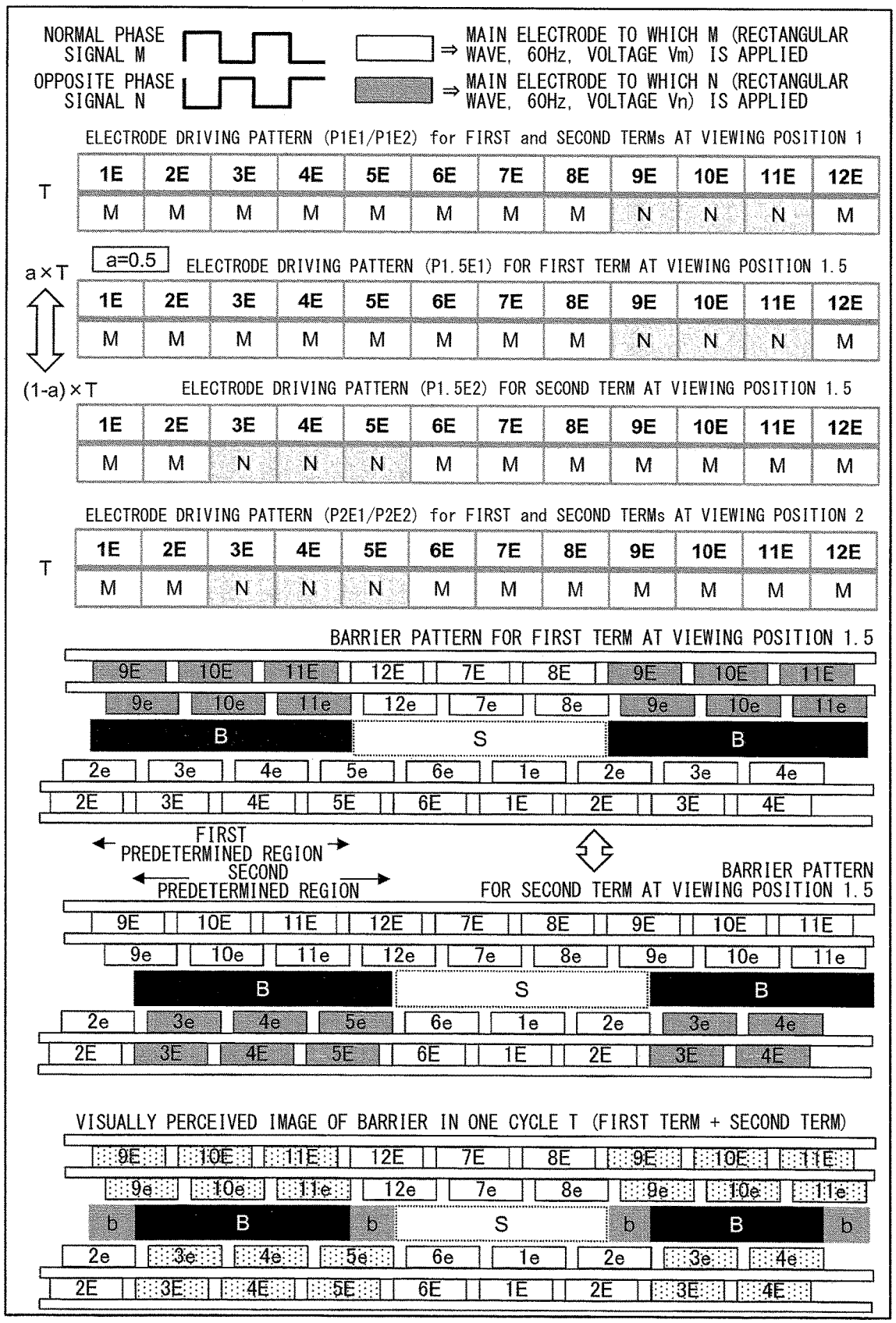
FIG. 14 is a diagram for explaining an example of how a switching liquid crystal panel is driven (at viewing positions 1 through 2) in Embodiment 2.

FIG. 14 illustrates electrode driving patterns (P1E1/P1E1) in the first and second terms for the viewing position 1, electrode driving patterns (P1.5E1/P1.5E2) in the first and second terms for a viewing position 1.5 (between the viewing position 1 and the viewing position 2), and electrode driving patterns (P2E1/P2E1) in the first and second terms for the viewing position 2.

As illustrated in FIG. 14, in each of the first and second terms at the viewing position 1, a normal phase signal M (rectangular wave, 60 Hz, voltage Vm) is supplied to segment main electrodes 1E through 6E and main counter electrodes 7E, 8E, and 12E, and an opposite phase signal N (rectangular wave, 60 Hz, voltage Vn) is supplied to main counter electrodes 9E through 11E.

In the first term at the viewing position 1.5, a normal phase signal M (rectangular wave, 60 Hz, voltage Vm) is supplied to the segment main electrodes 1E through 6E and the main counter electrodes 7E, 8E, and 12E, and an opposite phase signal N (rectangular wave, 60 Hz, voltage Vn) is supplied to the main counter electrodes 9E through 11E. In the second term at the viewing position 1.5, the normal phase signal M is supplied to the segment main electrodes 1E, 2E, and 6E and the main counter electrodes 7E through 12E, and the opposite phase signal N is supplied to the segment main electrodes 3E through 5E.

In each of the first and second terms at the viewing position 2, the normal phase signal M is supplied to the segment main electrodes 1E, 2E, and 6E and the main counter electrodes 7E through 12E, and the opposite phase signal N is supplied to the segment main electrodes 3E through 5E.

Note that one cycle is represented as T, the first term is represented as a×T, and the second term is represented as (1−a)×T, where 0<a<1. Here, T=8 ms and a=0.5.

With the above electrode driving patterns, in both the first and second terms at the viewing position 1, the entirety of a first predetermined region (a region corresponding to 9E through 11E and 9e through 11e) of the switching liquid crystal panel Y becomes a barrier in a light-blocking state B, and a first adjacent region (a region corresponding to 12E, 7E, 8E, 12e, 7e, and 8e) which is adjacent to the first predetermined region in the horizontal direction becomes a slit in a light-transmitting state S.

In the first term at the viewing position 1.5 (between the viewing position 1 and the viewing position 2), the entirety of the first predetermined region (the region corresponding to 9E through 11E and 9e through 11e) of the switching liquid crystal panel Y becomes a barrier in a light-blocking state B, and the first adjacent region (a region corresponding to 12E, 7E, 8E, 12e, 7e, and 8e) which is adjacent to the first predetermined region in the horizontal direction becomes a slit in a light-transmitting state S. In the second term at the viewing position 1.5, the entirety of a second predetermined region (a region which corresponds to 3E through 5E and 3e through 5e and which is offset from the first predetermined region by an offset amount equal to half the electrode pitch (Ep/2) in the direction of movement of viewing position) becomes a barrier in a light-blocking state B, and a second adjacent region (a region corresponding to 6E, 1E, 2E, 6e, 1e, and 2e) which is adjacent to the second predetermined region in the horizontal direction becomes a slit in a light-transmitting state S. It can also be said that, in the second term at the viewing position 1.5, one of two side regions in the first predetermined region takes on a light-transmitting state S, the remaining region in the first predetermined region becomes a barrier in a light-blocking state B, and a part of the first adjacent region takes on a light-transmitting state S.

In the first and second terms at the viewing position 2, the entirety of the second predetermined region (the region which corresponds to 3E through 5E and 3e through 5e) becomes a barrier in a light-blocking state B, and the second adjacent region (the region corresponding to 6E, 1E, 2E, 6e, 1e, and 2e) which is adjacent to the second predetermined region in the horizontal direction becomes a slit in a light-transmitting state S.

In this way, by dividing one cycle, at a viewing position between the viewing position 1 and the viewing position 2 (i.e., at the viewing position 1.5), into a first term and second term and by utilizing the barrier pattern of the viewing position 1 during the first term and the barrier pattern of the viewing position 2 during the second term, it is possible to, during one cycle T, substantially form a barrier pattern which is in a state between the barrier pattern of the viewing position 1 and the barrier pattern of the viewing position 2 (i.e., to increase the number of barrier patterns).

This decreases the change in luminance occurring when a viewer moves from the viewing position 1 to the viewing position 2. Furthermore, because there is a region which is in a light-transmitting state throughout both the first and second terms (throughout one cycle), it is possible to secure the luminance of the display.

For the viewing position 2.5 (a position between the viewing position 2 and the viewing position 3; the same applies below), electrode driving patterns P2.5E1/P2.5E2 illustrated in FIG. 15 can be used; for the viewing position 3, electrode driving patterns P3E1/P3E2 illustrated in FIG. 15 can be used; for the viewing position 3.5, electrode driving patterns P3.5E1/P3.5E2 illustrated in FIG. 15 can be used; for the viewing position 4, electrode driving patterns P4E1/P4E2 illustrated in FIG. 15 can be used; for the viewing position 4.5, electrode driving patterns P4.5E1/P4.5E2 illustrated in FIG. 16 can be used; for the viewing position 5, electrode driving patterns P5E1/P5E2 illustrated in FIG. 16 can be used; for the viewing position 5.5, electrode driving patterns P5.5E1/P5.5E2 illustrated in FIG. 16 can be used; for the viewing position 6, electrode driving patterns P6E1/P6E2 illustrated in FIG. 16 can be used; for the viewing position 6.5, electrode driving patterns P6.5E1/P6.5E2 illustrated in FIG. 16 can be used; for the viewing position 7, electrode driving patterns P7E1/P7E2 illustrated in FIG. 16 can be used; for the viewing position 7.5, electrode driving patterns P7.5E1/P7.5E2 illustrated in FIG. 16 can be used; for the viewing position 8, electrode driving patterns P8E1/P8E2 illustrated in FIG. 16 can be used; for the viewing position 8.5, electrode driving patterns P8.5E1/P8.5E2 illustrated in FIG. 17 can be used; for the viewing position 9, electrode driving patterns P9E1/P9E2 illustrated in FIG. 17 can be used; for the viewing position 9.5, electrode driving patterns P9.5E1/P9.5E2 illustrated in FIG. 17 can be used; for the viewing position 10, electrode driving patterns P10E1/P10E2 illustrated in FIG. 17 can be used; for the viewing position 10.5, electrode driving patterns P10.5E1/P10.5E2 illustrated in FIG. 17 can be used; for the viewing position 11, electrode driving patterns P11E1/P11E2 illustrated in FIG. 17 can be used; for the viewing position 11.5, electrode driving patterns P11.5E1/P11.5E2 illustrated in FIG. 17 can be used; and for the viewing position 12, electrode driving patterns P12E1/P12E2 illustrated in FIG. 17 can be used.

With Embodiment 2, for luminance properties with respect to polar angle, it is possible to interpolate between a viewing position n and a viewing position (n+1), as illustrated in (a) of FIG. 18. Furthermore, for crosstalk properties with respect to polar angle, it is possible to interpolate between a viewing position n and a viewing position (n+1), as illustrated in (b) of FIG. 18.

Embodiment 3

Figure 19:
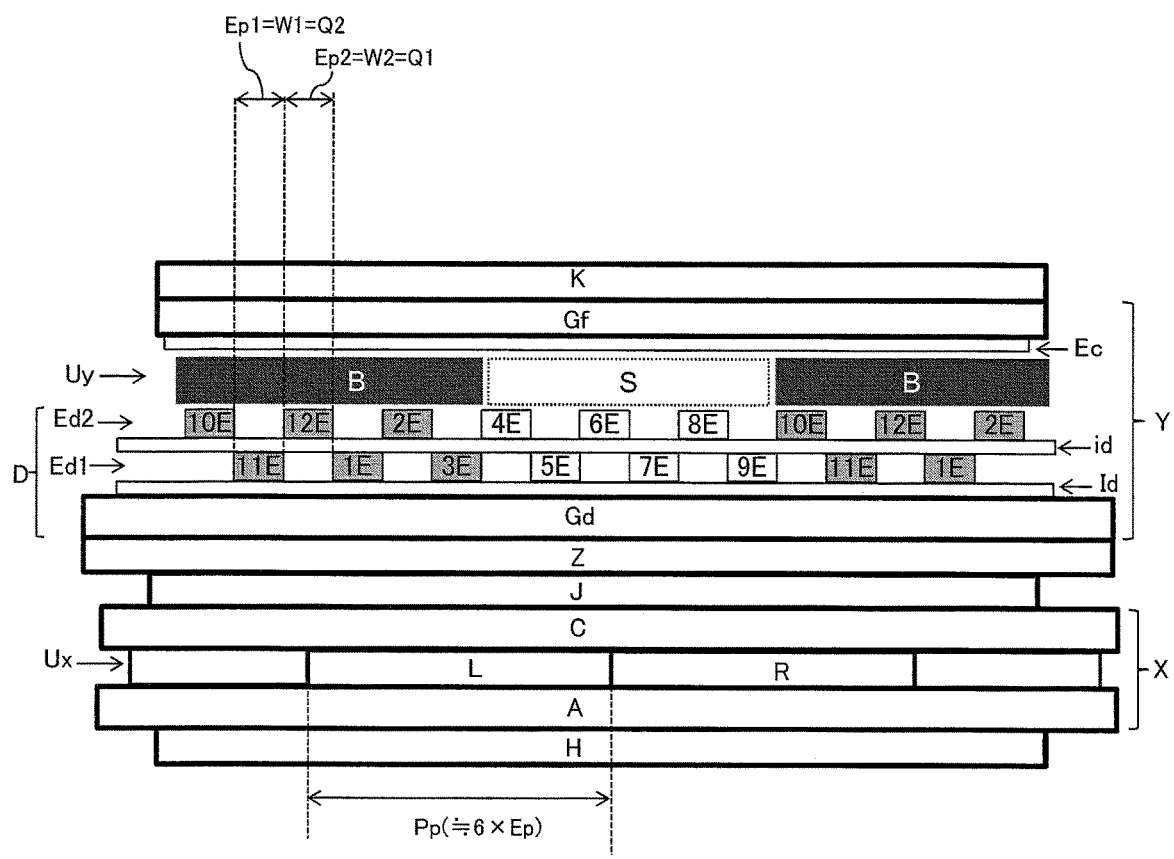
FIG. 19 is a schematic diagram illustrating an example configuration of a display device in accordance with Embodiment 3.

As illustrated in FIG. 19, a display device in accordance with Embodiment 3 has a substrate D (segment substrate) which includes, in this order, a glass substrate Gd, an insulating film Id, a first segment electrode layer Ed1, an insulating film id, and a second segment electrode layer Ed2.

The first segment electrode layer Ed1 includes a plurality of groups, each of which is constituted by a plurality of segment electrodes. In each one of the plurality of groups, six segment electrodes 1E, 3E, 5E, 7E, 9E, and 11E (each having a width W1) are arranged in this order along the horizontal direction, such that each adjacent pair of segment electrodes have a gap Q1 therebetween (electrode pitch Ep1 of first segment electrode layer=W1=Q2).

The second segment electrode layer Ed2 includes a plurality of groups, each of which is constituted by a plurality of segment electrodes. In each one of the plurality of groups, six segment electrodes 2E, 4E, 6E, 8E, 10E, and 12E (each having a width W2) are arranged in this order along the horizontal direction, such that each adjacent pair of segment electrodes have a gap Q2 therebetween (electrode pitch Ep2 of second segment electrode layer=W2=Q1). Note here that Ep1=Ep2=W1=W2=Q1=Q2. Furthermore, the n-th group (n: a natural number) in the first segment electrode layer Ed1 and the n-th group in the second segment electrode layer Ed2 are positionally offset from each other in the horizontal direction by an offset amount equal to the electrode pitch.

In other words, the segment electrode 2E is arranged so as to overlap a gap between the segment electrodes 1E and 3E which are adjacent to each other, the segment electrode 4E is arranged so as to overlap a gap between the segment electrodes 3E and 5E which are adjacent to each other, the segment electrode 6E is arranged so as to overlap a gap between the segment electrodes 5E and 7E which are adjacent to each other, the segment electrode 8E is arranged so as to overlap a gap between the segment electrodes 7E and 9E which are adjacent to each other, the segment electrode 10E is arranged so as to overlap a gap between the segment electrodes 9E and 11E which are adjacent to each other, and the segment electrode 12E is arranged so as to overlap a gap between the segment electrodes 11E and 1E which are adjacent to each other. In the present example, the number of segment electrodes in each group of the first segment electrode layer and the second segment electrode layer is six, but the number of segment electrodes is not limited to this example.

Furthermore, a substrate F (counter substrate) as illustrated in FIG. 19 includes, in this order, a glass substrate Gf and a common electrode Ec which is one solid electrode.

In FIG. 19, the electrode pitch Ep1 and the electrode pitch Ep2 are both approximately 8.45 µm, the width W1 and the width W2 of the electrodes are both approximately 8.45 µm, and the gap Q1 and gap Q2 between electrodes are both approximately 8.45 µm. Furthermore, a liquid crystal layer Uy (normally white TN liquid crystals), which is sandwiched by the segment substrate D and the counter substrate F, has as cell thickness of 4.6 µm, a birefringent index of 0.11, and retardation of 506 nm. Note that with a main liquid crystal panel X, a pixel L, which displays an image for the left eye, and a pixel R, which displays an image for the right eye, are provided in an alternating manner in the horizontal direction (a rightward direction, as seen in the figure). The pixel pitch Pp is 50.7 µm (approximately 6×Ep).

With regards to the switching liquid crystal panel Y illustrated in FIG. 19, by supplying signals to the segment electrodes 1E through 3E and 10E through 12E and the segment electrodes 4E through 9E, and the common electrode Ec such that, for example, the phase of (i) the signal supplied to the segment electrodes 1E through 3E and 10E through 12E is opposite to the phase of (ii) the signal supplied to the segment electrodes 4E through 9E and the common electrode Ec, it is possible to cause a region corresponding to 1E through 3E and 10E through 12E to become a barrier in a light-blocking state B, and cause a region corresponding to 4E through 9E to become a slit in a light-transmitting state S.

In Embodiment 3, with regards to three-dimensional displaying, for each of a viewing position 1 through a viewing position 12, a barrier pattern is changed so as to differ between a first term and a second term in one cycle. The viewing position 1 through the viewing position 12 are aligned in this order along the horizontal direction (in a rightward direction, as seen in the drawing).

Figure 20:
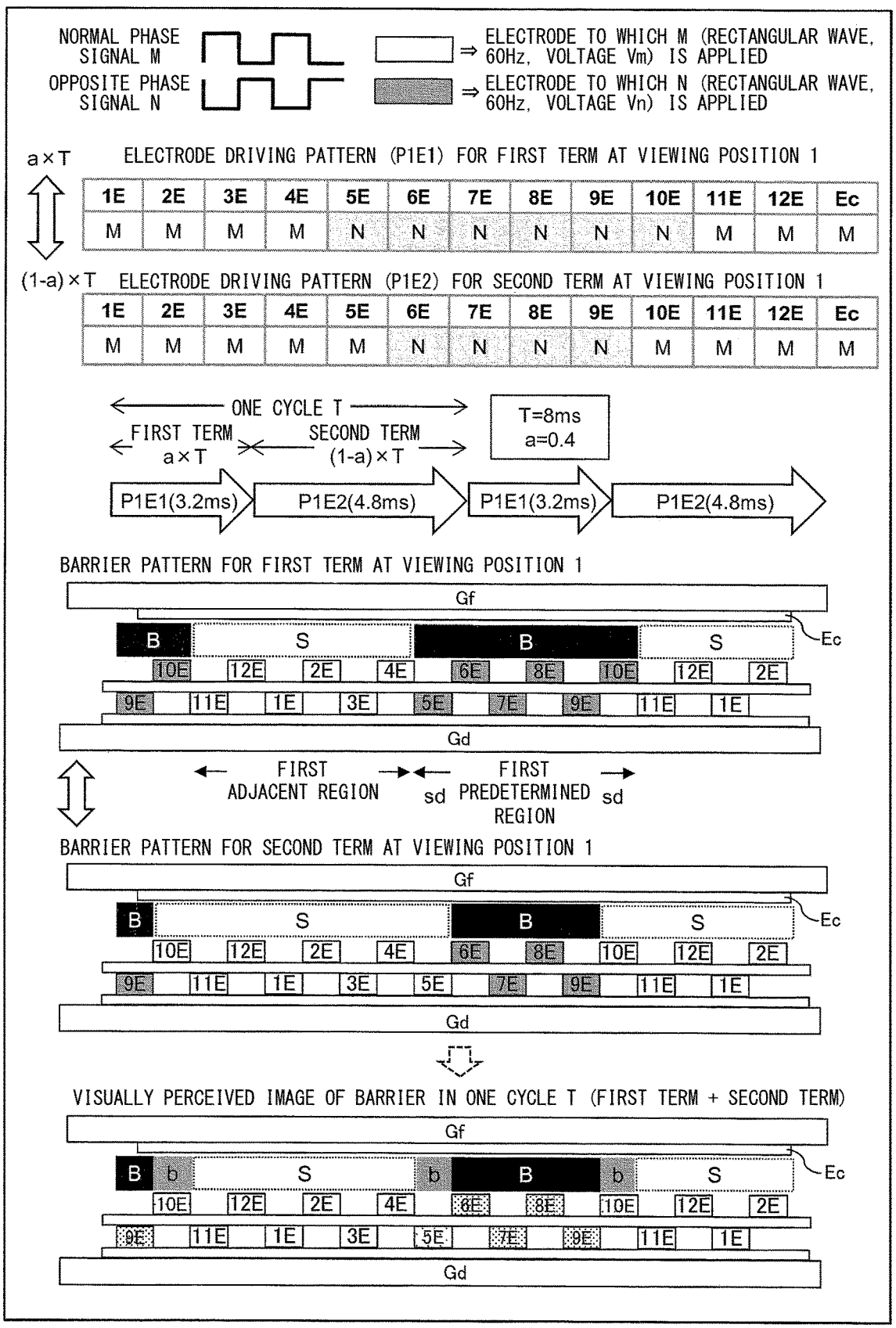
FIG. 20 is a diagram for explaining an example of how a switching liquid crystal panel is driven (at a viewing position 1) in Embodiment 3.

Specifically, the electrode driving patterns (P1E1/P1E2) for the first and second terms at viewing position 1 are as follows, as illustrated in FIG. 20. In the first term at the viewing position 1, a normal phase signal M (rectangular wave, 60 Hz, voltage Vm) is supplied to the segment electrodes 1E through 4E, the segment electrodes 11E and 12E, and the common electrode Ec, and an opposite phase signal N (rectangular wave, 60 Hz, voltage Vn) is supplied to the segment electrodes 5E through 10E. In the second term at the viewing position 1, the normal phase signal M is supplied to the segment electrodes 1E through 5E, the segment electrodes 10E through 12E, and the common electrode Ec, and the opposite phase signal N is supplied to the segment electrodes 6E through 9E. Note that one cycle is represented as T, the first term is represented as a×T, and the second term is represented as (1−a)×T, where 0<a<1. Here, T=8 ms and a=0.4.

With the above electrode driving patterns, in the first term, the entirety of a first predetermined region (a region corresponding to 5E through 10E) of the switching liquid crystal panel Y becomes a barrier in a light-blocking state B, and a first adjacent region (a region corresponding to 11E, 12E, and 1E through 4E) which is adjacent to the first predetermined region in the horizontal direction becomes a slit in a light-transmitting state S. In the second term, two side regions sd in the first predetermined region take on a light-transmitting state S, a remaining region (a region corresponding to 6E through 9E) in the first predetermined region becomes a barrier in a light-blocking state B, and the entirety of the first adjacent region takes on a light-transmitting state S.

In this way, by dividing one cycle into first and second terms and by causing the barrier to be narrower and the slit to be wider in the second term than in the first term, it is possible to cause, in one cycle T, the first predetermined region to have (i) two side regions in a gray state b (a state between light blocking and light transmitting) and (ii) a remaining region (the region sandwiched between the two side regions) in a light-blocking state B.

This makes it possible to suppress the light concentration effect caused by the side regions and reduce changes in luminance (i.e., reduce flicker). Furthermore, because there is a region (first adjacent region) which is in a light-transmitting state throughout both the first and second terms (throughout one cycle), it is possible to secure the luminance of the display.

Figure 21:
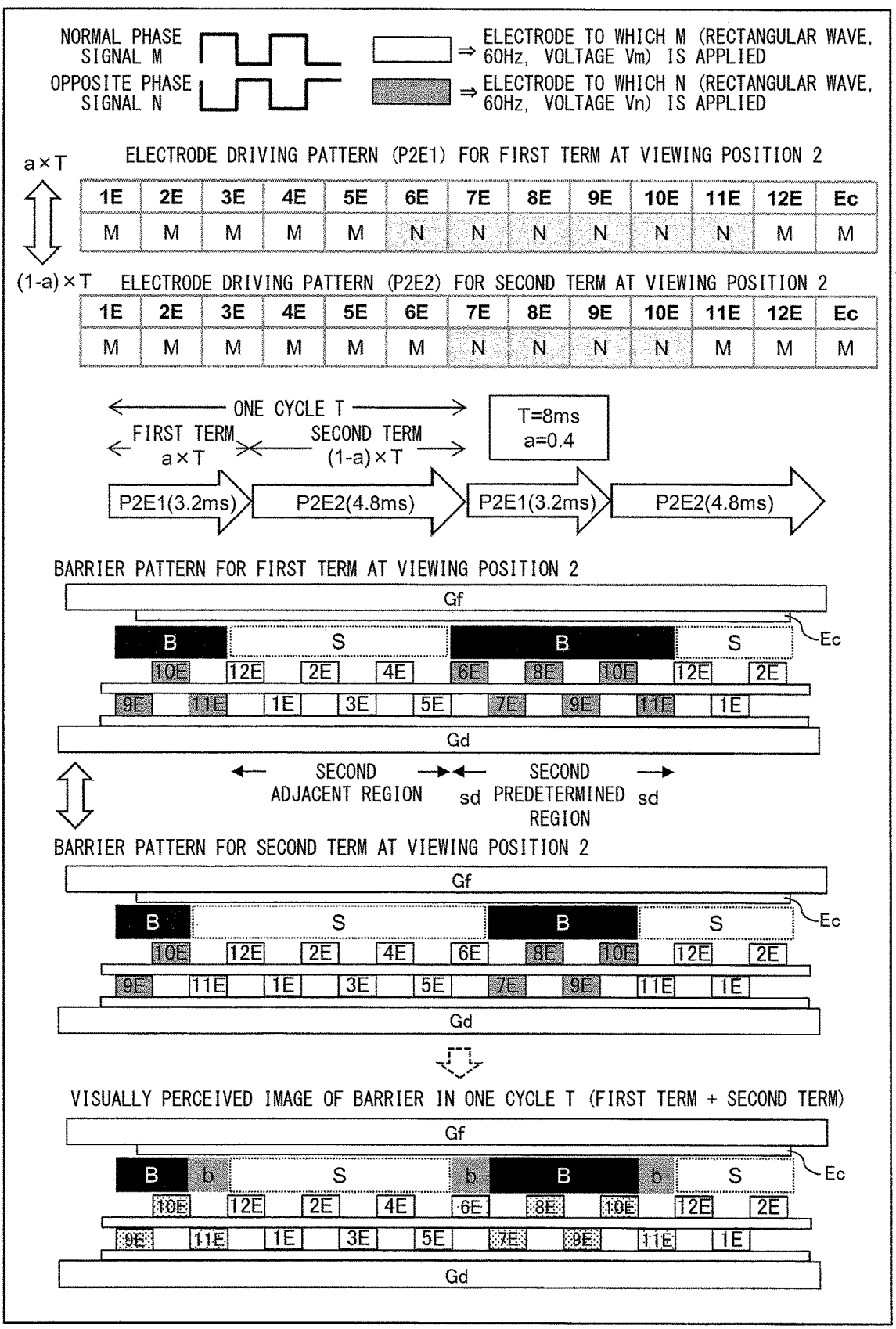
FIG. 21 is a diagram for explaining an example of how the switching liquid crystal panel is driven (at a viewing position 2) in Embodiment 3.

The electrode driving patterns (P2E1/P2E2) for the first and second terms at the viewing position 2 are as follows, as illustrated in FIG. 21. In the first term at the viewing position 2, the normal phase signal M is supplied to the segment electrodes 1E through 5E, the segment electrode 12E, and the common electrode Ec, and the opposite phase signal N is supplied to the segment electrodes 6E through 11E. In the second term at the viewing position 2, the normal phase signal M is supplied to the segment electrodes 1E through 6E, the segment electrodes 11E and 12E, and the common electrode Ec, and the opposite phase signal N is supplied to the segment electrodes 7E through 10E. Note that one cycle is represented as T, the first term is represented as a×T, and the second term is represented as (1−a)×T, where 0<a<1. Here, T=8 ms and a=0.4.

With the above electrode driving patterns, in the first term, the entirety of a second predetermined region (a region corresponding to 6E through 11E) of the switching liquid crystal panel Y becomes a barrier in a light-blocking state B, and a second adjacent region (a region corresponding to 12E and 1E through 5E) which is adjacent to the second predetermined region in the horizontal direction becomes a slit in a light-transmitting state S, In the second term, two side regions sd in the second predetermined region take on a light-transmitting state S, a remaining region (a region corresponding to 7E through 10E) in the second predetermined region becomes a barrier in a light-blocking state B, and the entirety of the second adjacent region takes on a light-transmitting state S.

In this way, by dividing one cycle into first and second terms and by causing the barrier to be narrower and the slit to be wider in the second term than in the first term, it is possible to cause, in one cycle T, the second predetermined region to have (i) two side regions in a gray state b (a state between light blocking and light transmitting) and (ii) a remaining region (the region sandwiched between the two side regions) in a light-blocking state B.

This makes it possible to suppress the light concentration effect caused by the side regions and reduce changes in luminance (i.e., reduce flicker). Furthermore, because there is a region (second adjacent region) which is in a light-transmitting state throughout both the first and second terms (throughout one cycle), it is possible to secure the luminance of the display.

For the viewing position 3, electrode driving patterns P3E1/P3E2 illustrated in FIG. 22 can be used; for the viewing position 4, electrode driving patterns P4E1/P4E2 illustrated in FIG. 22 can be used; for the viewing position 5, electrode driving patterns P5E1/P5E2 illustrated in FIG. 22 can be used; for the viewing position 6, electrode driving patterns P6E1/P6E2 illustrated in FIG. 22 can be used; for the viewing position 7, electrode driving patterns P7E1/P7E2 illustrated in FIG. 23 can be used; for the viewing position 8, electrode driving patterns P8E1/P8E2 illustrated in FIG. 23 can be used; for the viewing position 9, electrode driving patterns P9E1/P9E2 illustrated in FIG. 23 can be used; for the viewing position 10, electrode driving patterns P10E1/P10E2 illustrated in FIG. 23 can be used; for the viewing position 11, electrode driving patterns P11E1/P1 E2 illustrated in FIG. 23 can be used; and for the viewing position 12, electrode driving patterns P12E1/P12E2 illustrated in FIG. 23 can be used.

Figure 24:
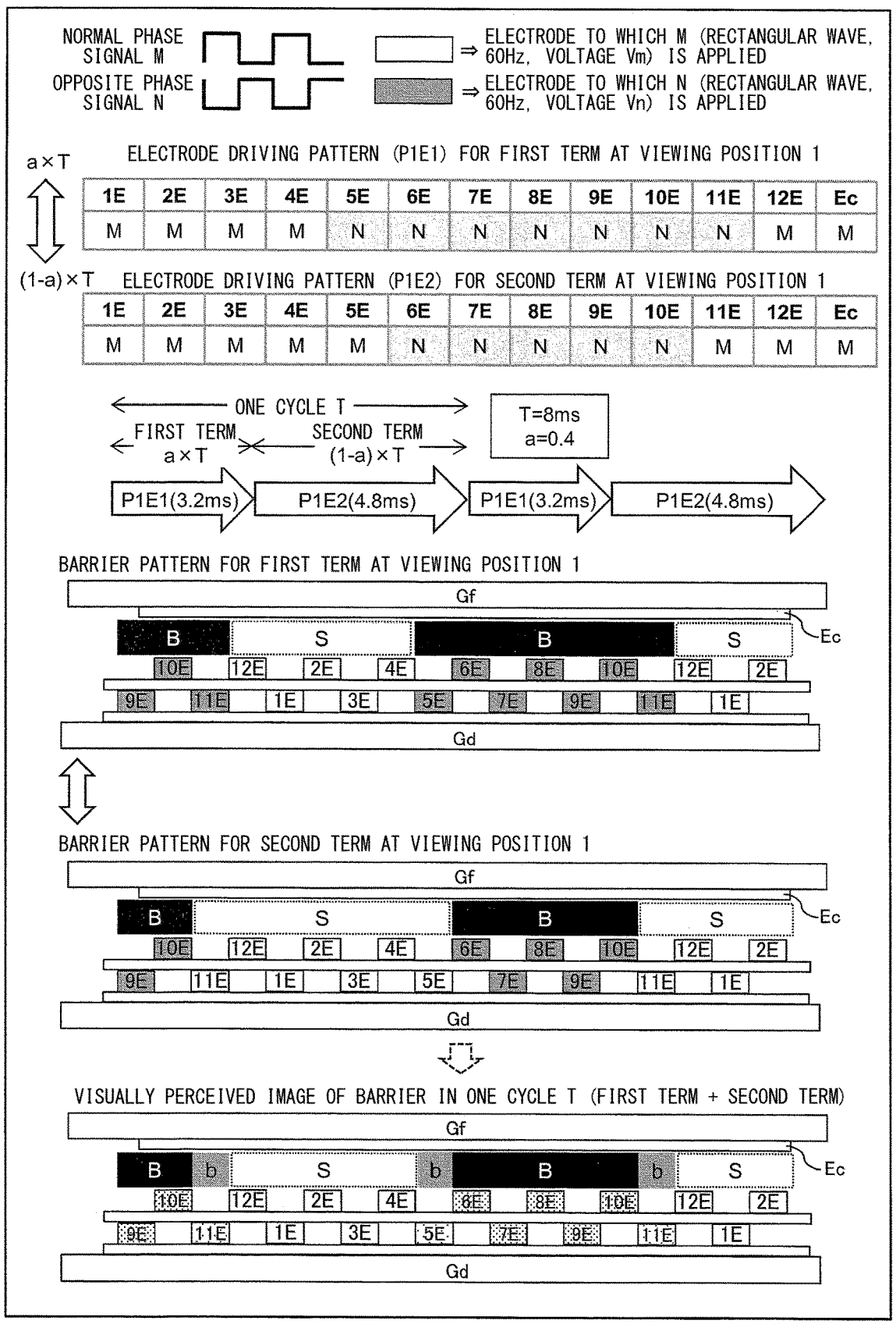
FIG. 24 is a diagram for explaining another example of how the switching liquid crystal panel is driven (at the viewing position 1) in Embodiment 3.
Figure 25:
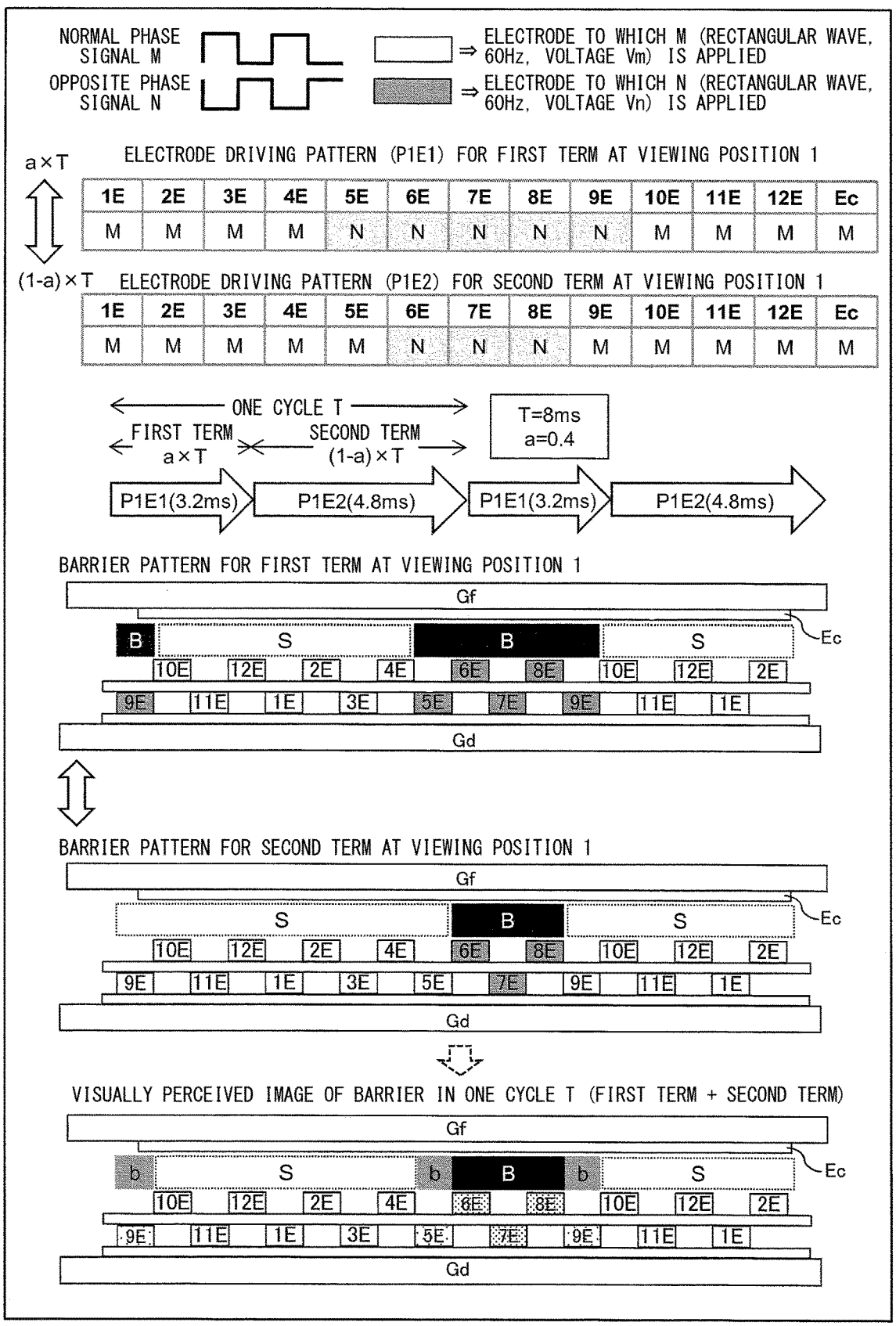
FIG. 25 is a diagram for explaining yet another example of how the switching liquid crystal panel is driven (at the viewing position 1) in Embodiment 3.
Figure 26:
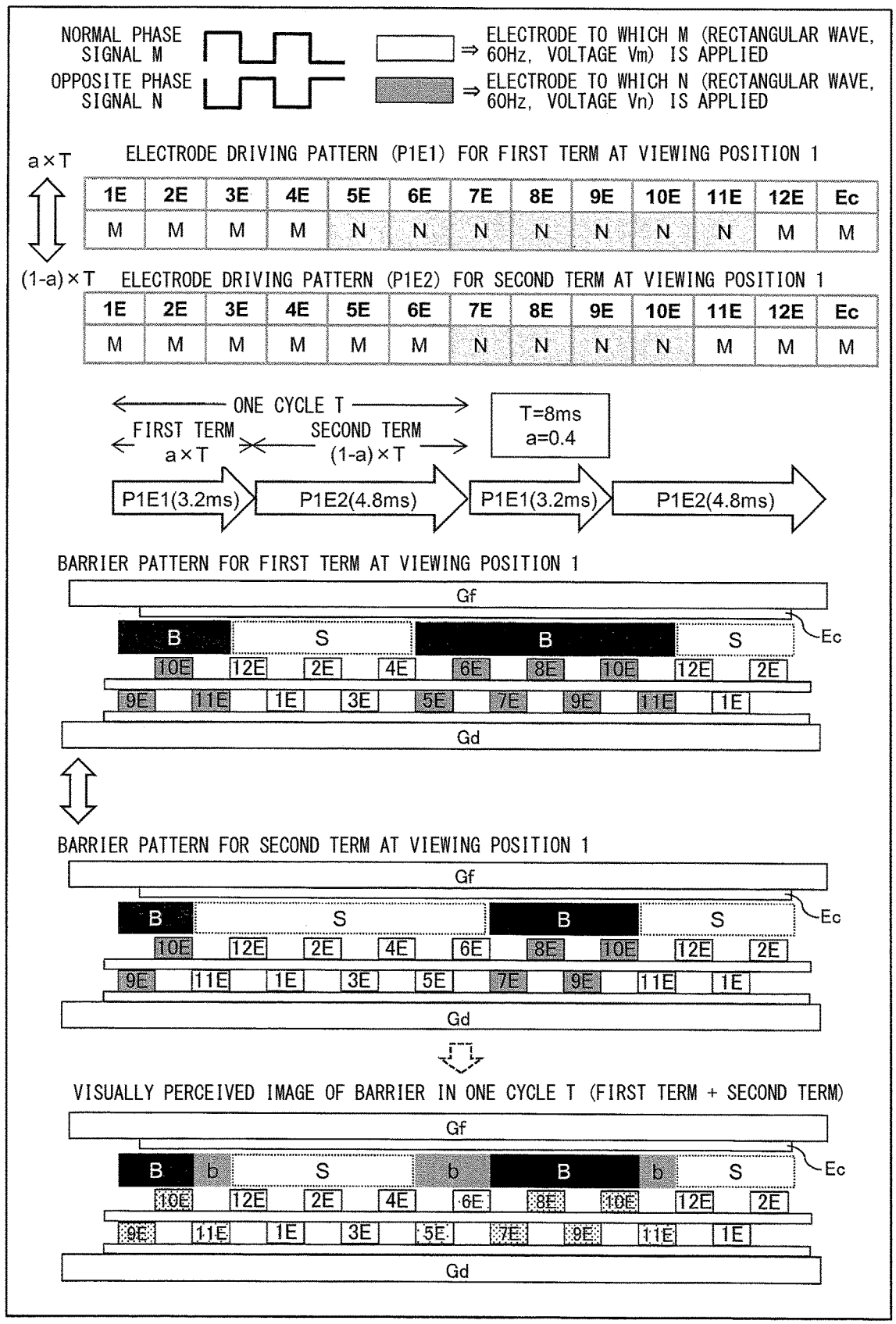
FIG. 26 is a diagram for explaining yet another example of how the switching liquid crystal panel is driven (at the viewing position 1) in Embodiment 3.
Figure 27:
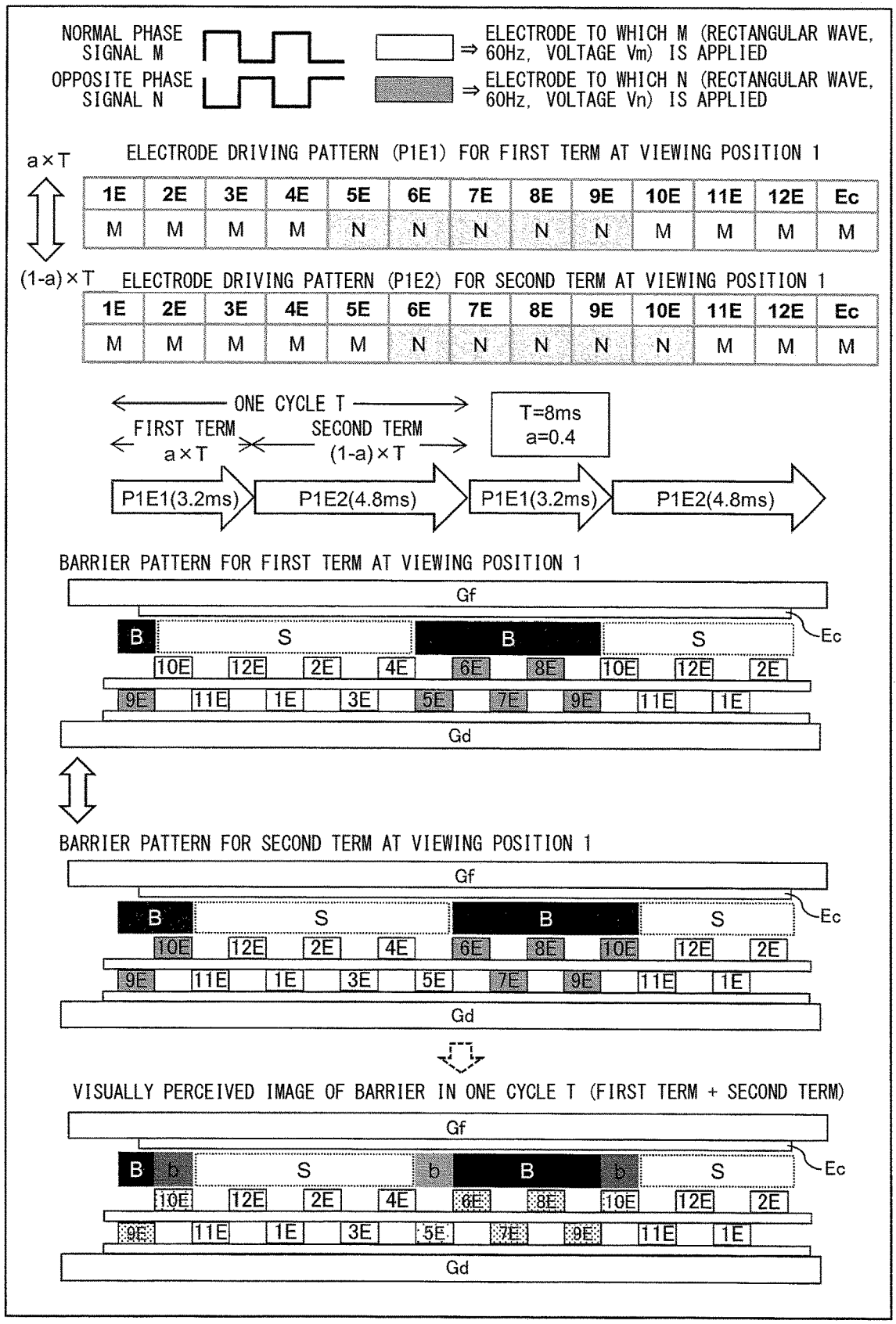
FIG. 27 is a diagram for explaining yet another example of how the switching liquid crystal panel is driven (at the viewing position 1) in Embodiment 3.
Figure 28:
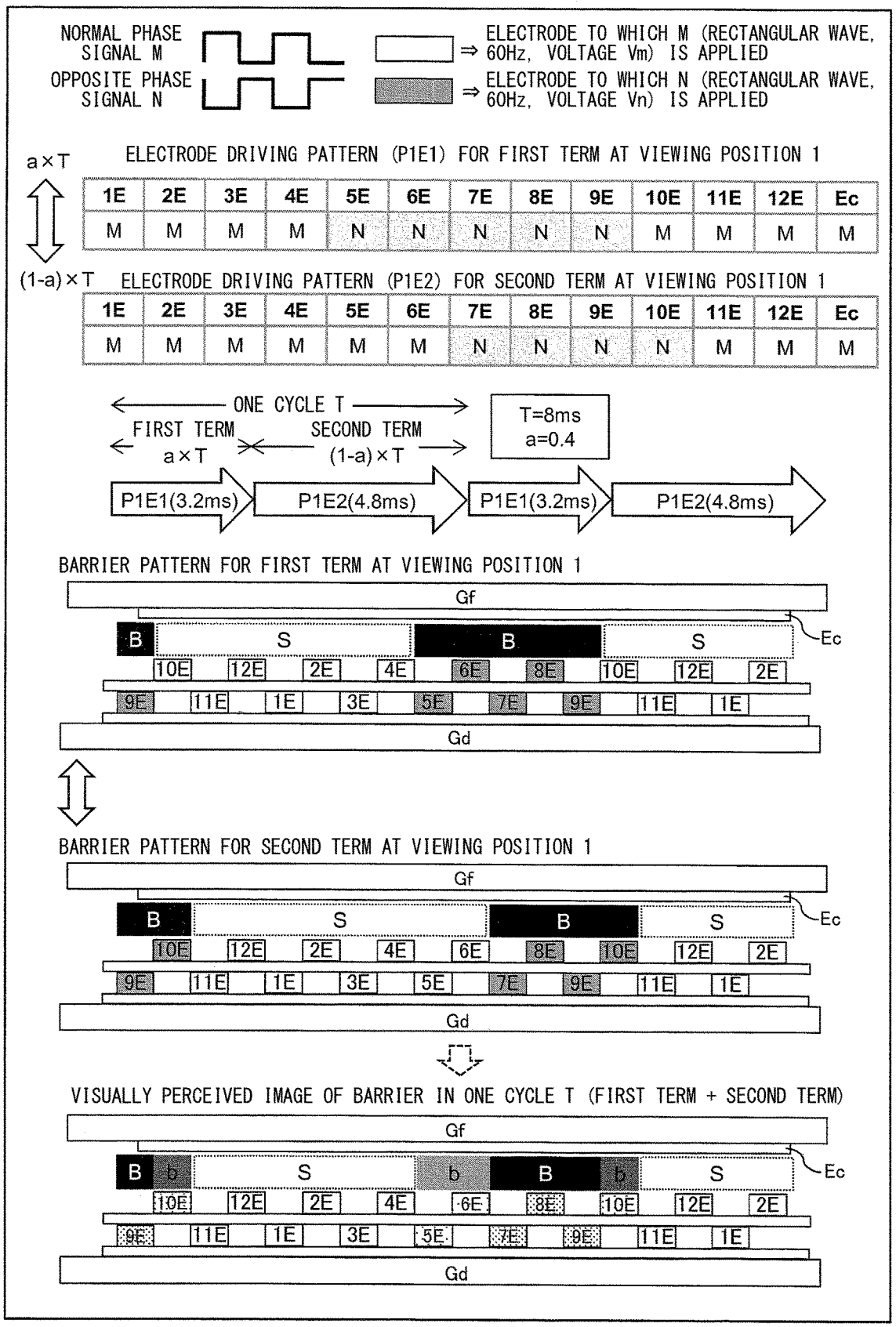
FIG. 28 is a diagram for explaining yet another example of how the switching liquid crystal panel is driven (at the viewing position 1) in Embodiment 3.

Note that the barrier pattern for the viewing position 1 in Embodiment 3 is not limited to that shown in FIG. 20. The barrier pattern for the viewing position 1 may have a wider barrier than that of FIG. 20, as illustrated in FIG. 24. The barrier pattern for the viewing position 1 may have a narrower barrier than that of FIG. 20, as illustrated in FIG. 25. The barrier pattern for the viewing position 1 may be such that, during the first term, the barrier is wider than that of FIG. 20, and during the second term, the position of the barrier is changed, as illustrated in FIG. 26. The barrier pattern for the viewing position 1 may be such that two side regions sd1 and sd2, which are in the first predetermined region and take on a gray state, have differing shades (gradation), as illustrated in FIG. 27. In such a case, the parameter a (which is the ratio expressing how much of one cycle is taken up by the first term) can be set to a value other than 0.5. The barrier pattern for the viewing position 1 may be such that two side regions sd1 and sd2, which are in the first predetermined region and take on a gray state, have differing widths, as illustrated in FIG. 28.

Embodiment 4

Embodiment 4 uses a switching liquid crystal panel Y which is structurally identical to that of Embodiment 3. With regards to three-dimensional displaying, in Embodiment 4, for each of a viewing position 1 through a viewing position 12, a barrier pattern remains unchanged throughout one cycle (i.e., driving is not altered on a time-divided basis). However, for a viewing position between (i) a viewing position n (n=1 . . . 11) and (ii) a viewing position (n+1), the barrier pattern is changed so as to differ between a first term and a second term in one cycle (i.e., driving is altered on a time-divided basis).

Figure 29:
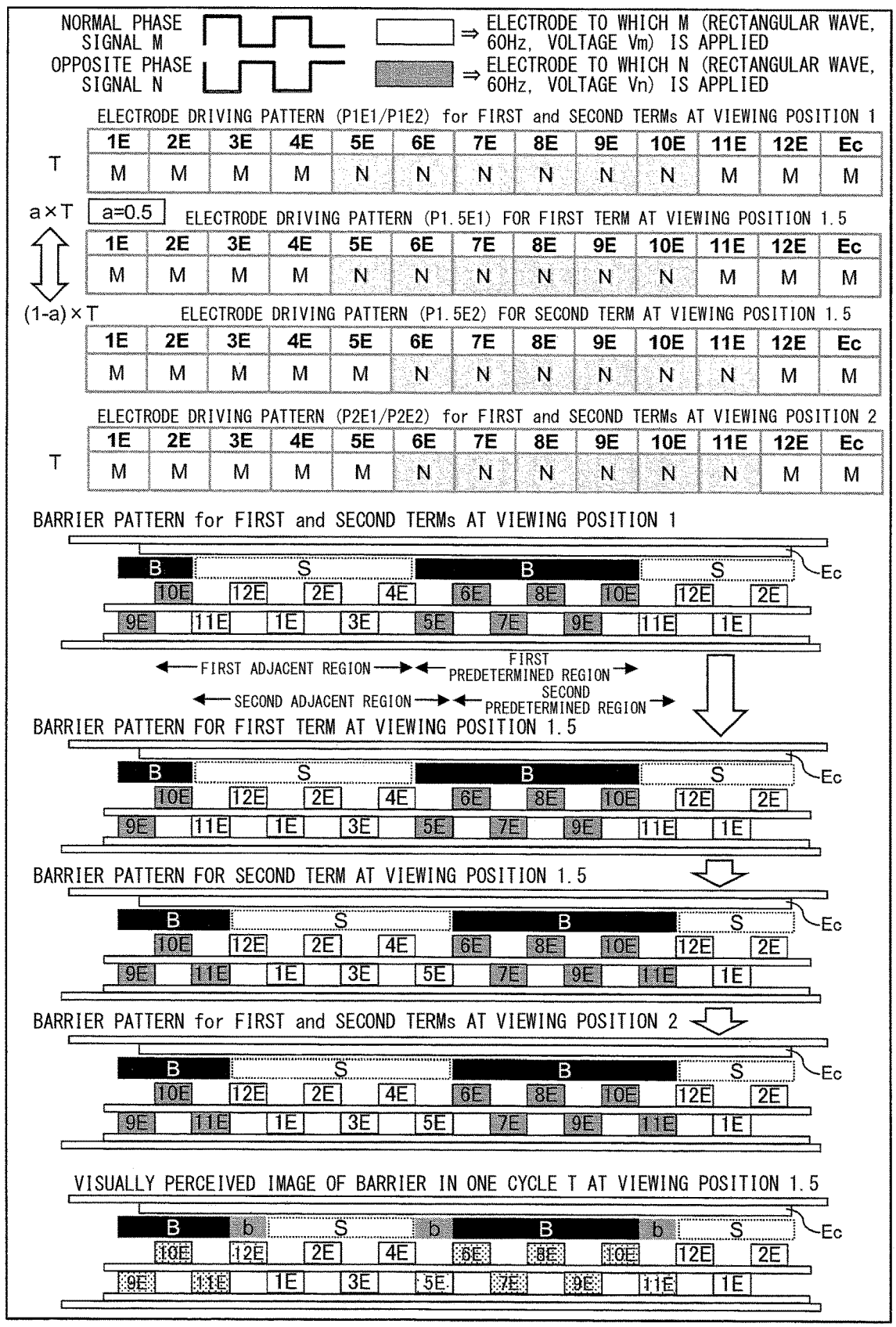
FIG. 29 is a diagram for explaining an example of how a switching liquid crystal panel is driven (at viewing positions 1 through 2) in Embodiment 4.

FIG. 29 illustrates electrode driving patterns (P1E1/P1E1) in the first and second terms for the viewing position 1, electrode driving patterns (P1.5E1/P1.5E2) in the first and second terms for a viewing position 1.5 (between the viewing position 1 and the viewing position 2), and electrode driving patterns (P2E1/P2E1) in the first and second terms for the viewing position 2.

As illustrated in FIG. 29, in each of the first and second terms at the viewing position 1, a normal phase signal M (rectangular wave, 60 Hz, voltage Vm) is supplied to segment electrodes 1E through 4E, segment electrodes 11E and 12E, and a common electrode Ec, and an opposite phase signal N (rectangular wave, 60 Hz, voltage Vn) is supplied to segment electrodes 5E through 10E.

In the first term at the viewing position 1.5, the normal phase signal M is supplied to the segment electrodes 1E through 4E, the segment electrodes 11E and 12E, and the common electrode Ec, and the opposite phase signal N is supplied to the segment electrodes 5E through 10E. In the second term at the viewing position 1.5, the normal phase signal M is supplied to the segment electrodes 1E through 5E, the segment electrode 12E, and the common electrode Ec, and the opposite phase signal N is supplied to the segment electrodes 6E through 11E.

In each of the first and second terms at the viewing position 2, the normal phase signal M is supplied to the segment electrodes 1E through 5E, the segment electrode 12E, and the common electrode Ec, and the opposite phase signal N is supplied to the segment electrodes 6E through 11E.

Note that one cycle is represented as T, the first term is represented as a×T, and the second term is represented as (1−a)×T, where 0<a<1. Here, T=8 ms and a=0.5.

With the above electrode driving patterns, in both the first and second terms at the viewing position 1, the entirety of a first predetermined region (a region corresponding to 5E through 10E) of the switching liquid crystal panel Y becomes a barrier in a light-blocking state B, and a first adjacent region (a region corresponding to 11E, 12E, and 1E through 4E) which is adjacent to the first predetermined region in the horizontal direction becomes a slit in a light-transmitting state S.

In the first term at the viewing position 1.5 (between the viewing position 1 and the viewing position 2), the entirety of the first predetermined region (the region corresponding to 5E through 10E) of the switching liquid crystal panel Y becomes a barrier in a light-blocking state B, and the first adjacent region (the region corresponding to 11E, 12E, and 1E through 4E) becomes a slit in a light-transmitting state S. In the second term at the viewing position 1.5, the entirety of a second predetermined region (a region which corresponds to 6E through 11E and which is offset from the first predetermined region by an offset amount equal to the electrode pitch (Ep) in the direction of movement of viewing position) becomes a barrier in a light-blocking state B, and a second adjacent region (a region corresponding to 12E and 1E through 5E) which is adjacent to the second predetermined region in the horizontal direction becomes a slit in a light-transmitting state S. It can also be said that, in the second term at the viewing position 1.5, one of two side regions in the first predetermined region takes on a light-transmitting state S, the remaining region in the first predetermined region becomes a barrier in a light-blocking state B, and a part of the first adjacent region takes on a light-transmitting state S.

In the first and second terms at the viewing position 2, the entirety of the second predetermined region (the region which corresponds to 6E through 11E) becomes a barrier in a light-blocking state B, and the second adjacent region (the region corresponding to 12E and 1E through 5E) becomes a slit in a light-transmitting state S.

In this way, by dividing one cycle, at a viewing position between the viewing position 1 and the viewing position 2 (i.e., at the viewing position 1.5), into a first term and second term and by utilizing the barrier pattern of the viewing position 1 during the first term and the barrier pattern of the viewing position 2 during the second term, it is possible to, during one cycle T, substantially form a barrier pattern which is in a state between the barrier pattern of the viewing position 1 and the barrier pattern of the viewing position 2 (i.e., to increase the number of barrier patterns).

This decreases the change in luminance occurring when a viewer moves from the viewing position 1 to the viewing position 2. Furthermore, because there is a region which is in a light-transmitting state throughout both the first and second terms (throughout one cycle), it is possible to secure the luminance of the display.

For the viewing position 2.5 (a position between the viewing position 2 and the viewing position 3; the same applies below), electrode driving patterns P2.5E1/P2.5E2 illustrated in FIG. 30 can be used; for the viewing position 3, electrode driving patterns P3E1/P3E2 illustrated in FIG. 30 can be used; for the viewing position 3.5, electrode driving patterns P3.5E1/P3.5E2 illustrated in FIG. 30 can be used; for the viewing position 4, electrode driving patterns P4E1/P4E2 illustrated in FIG. 30 can be used; for the viewing position 4.5, electrode driving patterns P4.5E1/P4.5E2 illustrated in FIG. 31 can be used; for the viewing position 5, electrode driving patterns P5E1/P5E2 illustrated in FIG. 31 can be used; for the viewing position 5.5, electrode driving patterns P5.5E1/P5.5E2 illustrated in FIG. 31 can be used; for the viewing position 6, electrode driving patterns P6E1/P6E2 illustrated in FIG. 31 can be used; for the viewing position 6.5, electrode driving patterns P6.5E1/P6.5E2 illustrated in FIG. 31 can be used; for the viewing position 7, electrode driving patterns P7E1/P7E2 illustrated in FIG. 31 can be used; for the viewing position 7.5, electrode driving patterns P7.5E1/P7.5E2 illustrated in FIG. 31 can be used; for the viewing position 8, electrode driving patterns P8E1/P8E2 illustrated in FIG. 31 can be used; for the viewing position 8.5, electrode driving patterns P8.5E1/P8.5E2 illustrated in FIG. 32 can be used; for the viewing position 9, electrode driving patterns P9E1/P9E2 illustrated in FIG. 32 can be used; for the viewing position 9.5, electrode driving patterns P9.5E1/P9.5E2 illustrated in FIG. 32 can be used; for the viewing position 10, electrode driving patterns P10E1/P10E2 illustrated in FIG. 32 can be used; for the viewing position 10.5, electrode driving patterns P10.5E1/P10.5E2 illustrated in FIG. 32 can be used; for the viewing position 11, electrode driving patterns P11E1/P11E2 illustrated in FIG. 32 can be used; for the viewing position 11.5, electrode driving patterns P11.5E1/P11.5E2 illustrated in FIG. 32 can be used; and for the viewing position 12, electrode driving patterns P12E1/P12E2 illustrated in FIG. 32 can be used.

Embodiment 5

Figure 33:
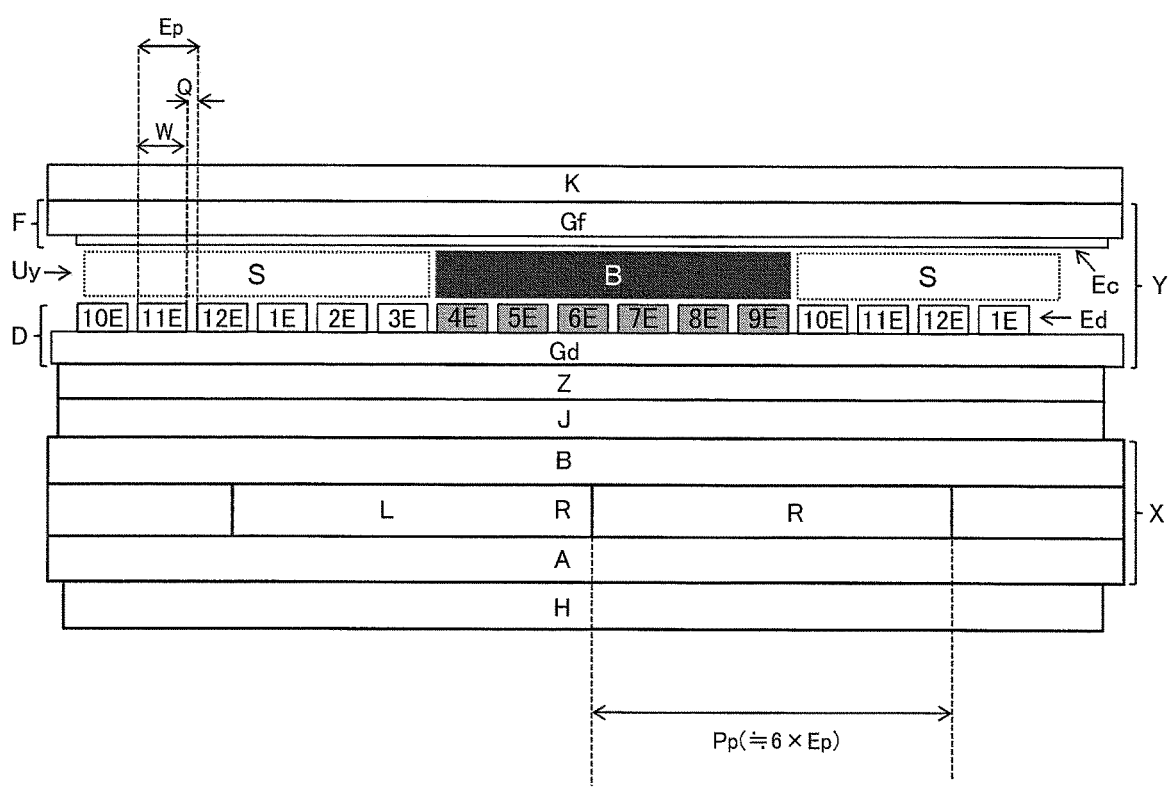
FIG. 33 is a schematic diagram illustrating an example configuration of a display device in accordance with Embodiment 5.

As illustrated in FIG. 33, a display device in accordance with Embodiment 5 has switching liquid crystal panel Y including a substrate D (segment substrate). The substrate D includes, in this order, a glass substrate Gd and a segment electrode layer Ed. The segment electrode layer Ed includes a plurality of groups, each of which is constituted by a plurality of segment electrodes. In each one of the plurality of groups, twelve segment electrodes 1E through 12E (each having a width W) are arranged in this order along the horizontal direction, such that each adjacent pair of segment electrodes have a gap Q therebetween (electrode pitch Ep=W+Q). Here, the electrode pitch Ep is 22.1 μm, the width W of each electrode is 17.1 μm, and the gap Q between each electrode is 5 μm. Furthermore, a liquid crystal layer Uy (normally white TN liquid crystals), which is sandwiched by the segment substrate D and a counter substrate F, has as cell thickness of 4.6 μm, a birefringent index of 0.11, and retardation of 506 nm. Note that with a main liquid crystal panel X, a pixel L, which displays an image for the left eye, and a pixel R, which displays an image for the right eye, are provided in an alternating manner in the horizontal direction (a rightward direction, as seen in the figure). The pixel pitch Pp is 132.8 μm (approximately 6×Ep). In the present example, the number of segment electrodes in each group of the segment electrode layer Ed is twelve, but the number of segment electrodes is not limited to this example.

With regards to the switching liquid crystal panel Y illustrated in FIG. 33, by supplying signals to segment electrodes 4E through 9E, segment electrodes 1E through 3E and 10E through 12E, and a common electrode Ec such that, for example, the phase of (i) the signal supplied to the segment electrodes 4E through 9E is opposite to the phase of (ii) the signal supplied to the segment electrodes 1E through 3E and 10E through 12E and the common electrode Ec, it is possible to cause a region corresponding to 4E through 9E to become a barrier in a light-blocking state B, and cause a region corresponding to 1E through 3E and 10E through 12E to become a slit in a light-transmitting state S.

In Embodiment 5, with regards to three-dimensional displaying, for each of a viewing position 1 through a viewing position 12, a barrier pattern is changed so as to differ between a first term and a second term in one cycle. This is accomplished by applying the electrode driving pattern s illustrated in FIGS. 22 and 23 to the switching liquid crystal panel Y illustrated in FIG. 33.

Figure 34:
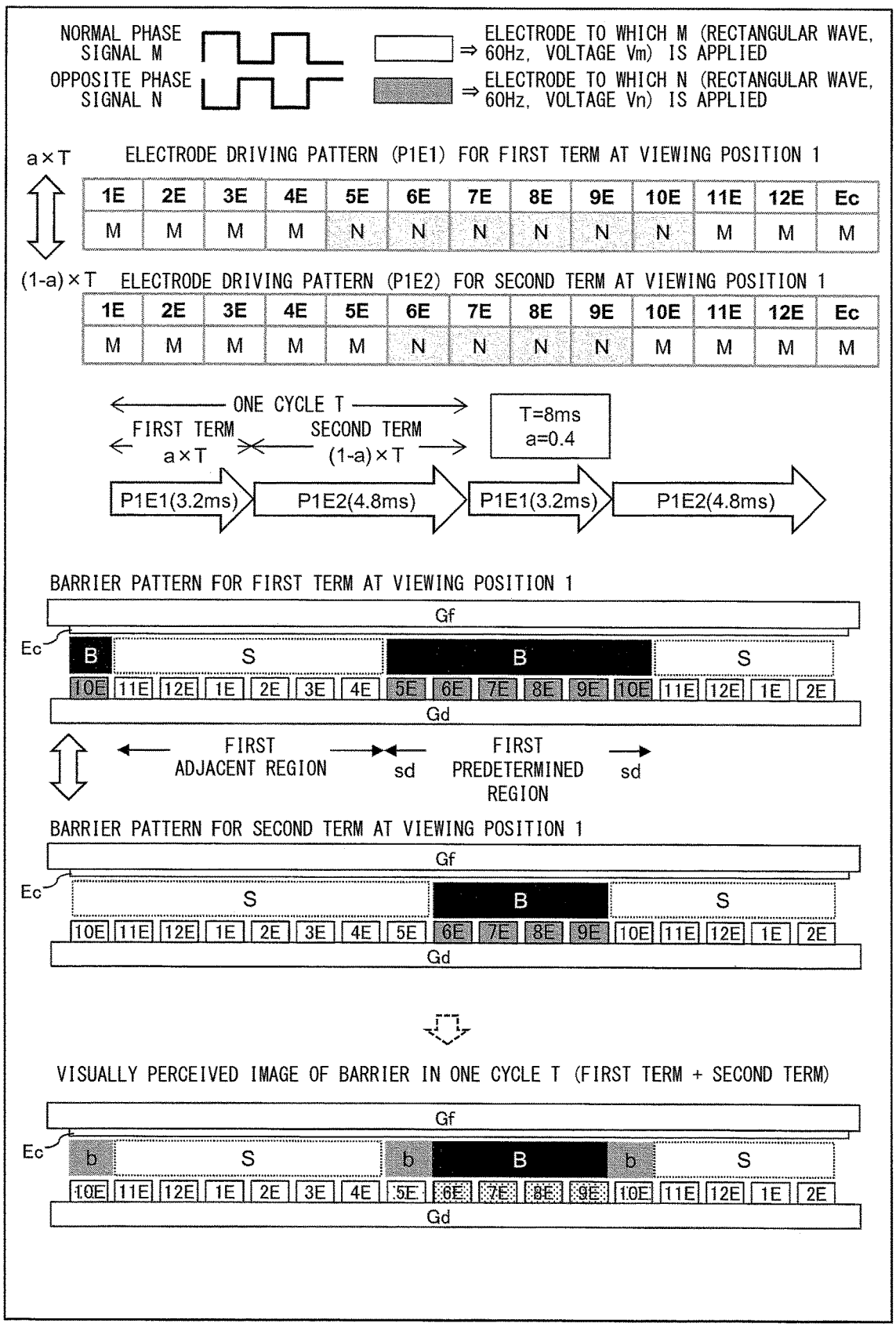
FIG. 34 is a diagram for explaining an example of how a switching liquid crystal panel is driven (at a viewing position 1) in Embodiment 5.
Figure 35:
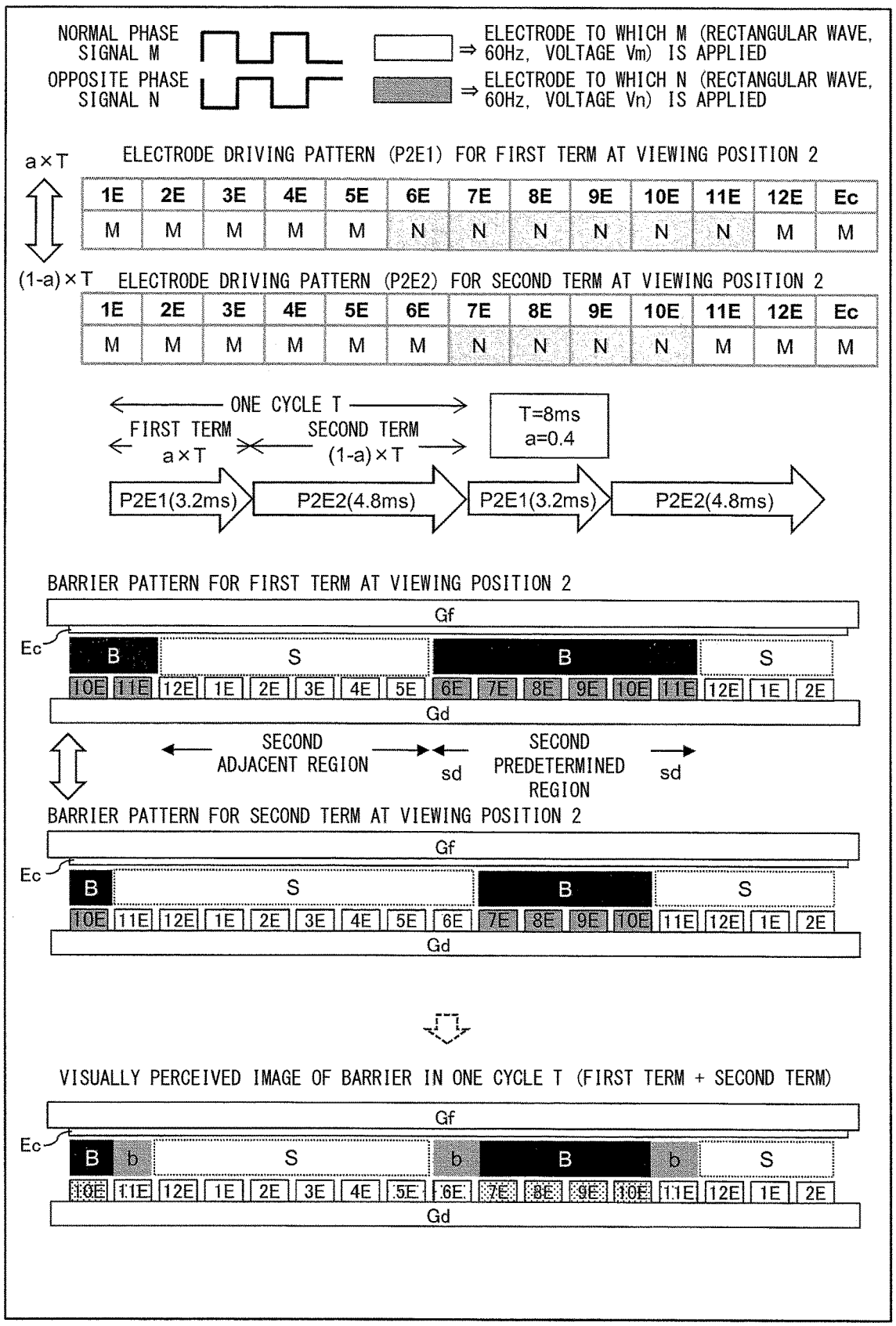
FIG. 35 is a diagram for explaining an example of how the switching liquid crystal panel is driven (at a viewing position 2) in Embodiment 5.

For example, the barrier patterns illustrated in FIG. 34 can be achieved by applying the electrode driving patterns P1E1/P1E2 illustrated in FIG. 22, and the barrier patterns illustrated in FIG. 35 can be achieved by applying the electrode driving patterns P2E1/P2E2 illustrated in FIG. 22.

Embodiment 6

Embodiment 6 uses a switching liquid crystal panel Y which is structurally identical to that of Embodiment 5 (see FIG. 33). With regards to three-dimensional displaying, in Embodiment 6, for each of a viewing position 1 through a viewing position 12, a barrier pattern remains unchanged throughout one cycle (i.e., driving is not altered on a time-divided basis). However, for a viewing position between (i) a viewing position n (n=1 . . . 11) and (ii) a viewing position (n+1), the barrier pattern is changed so as to differ between a first term and a second term in one cycle (i.e., driving is altered on a time-divided basis). This is accomplished by applying the electrode driving patterns illustrated in FIGS. 30 to 32 to the switching liquid crystal panel Y.

Figure 36:
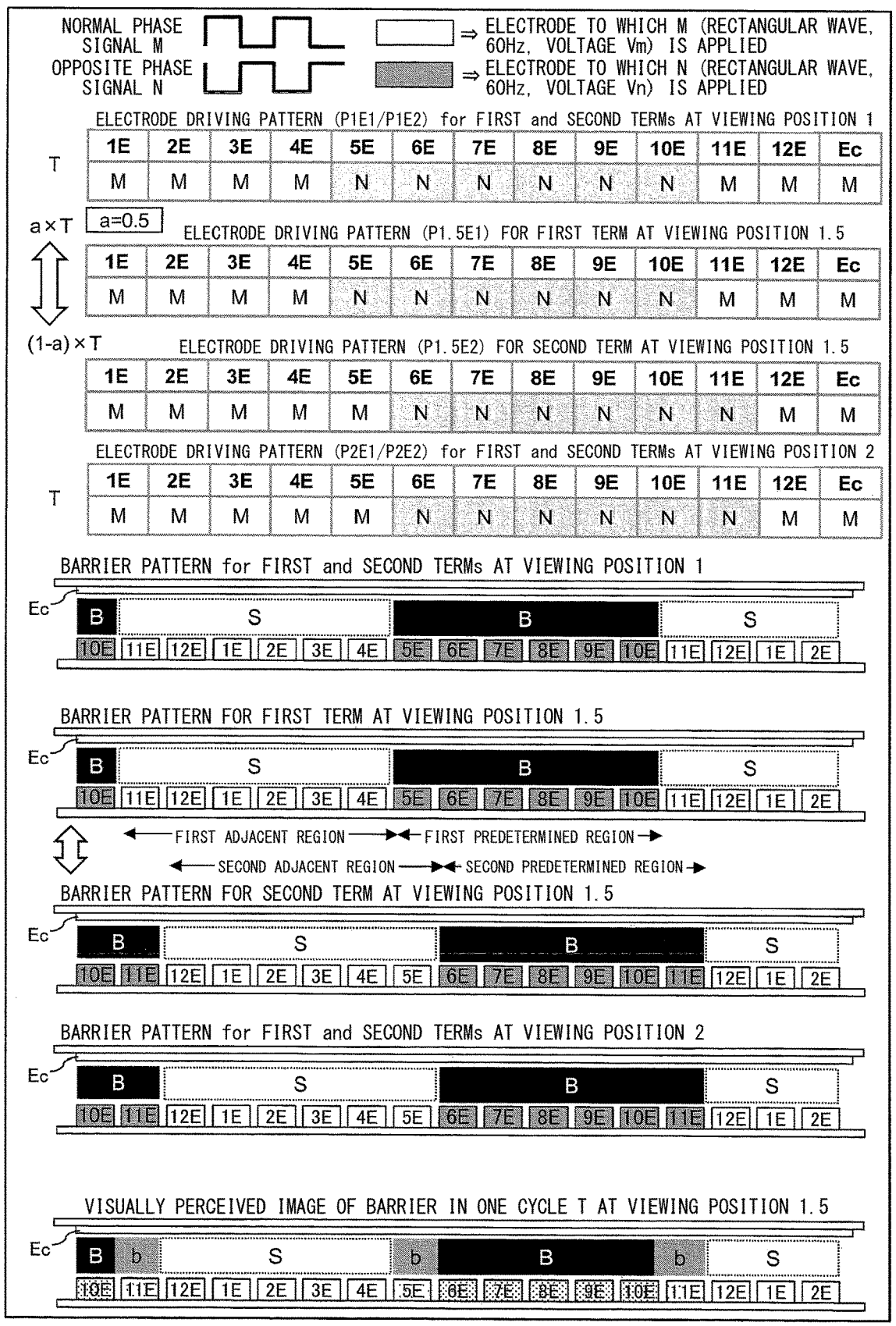
FIG. 36 is a diagram for explaining an example of how a switching liquid crystal panel is driven (at viewing positions 1 through 2) in Embodiment 6.

For example, the barrier patterns illustrated in FIG. 36 can be achieved by applying the electrode driving patterns P1E1/P1E2, P1.5E1/P1.5E2, and P2E1/P2E2 illustrated in FIG. 30.

Embodiment 71

Figure 37:
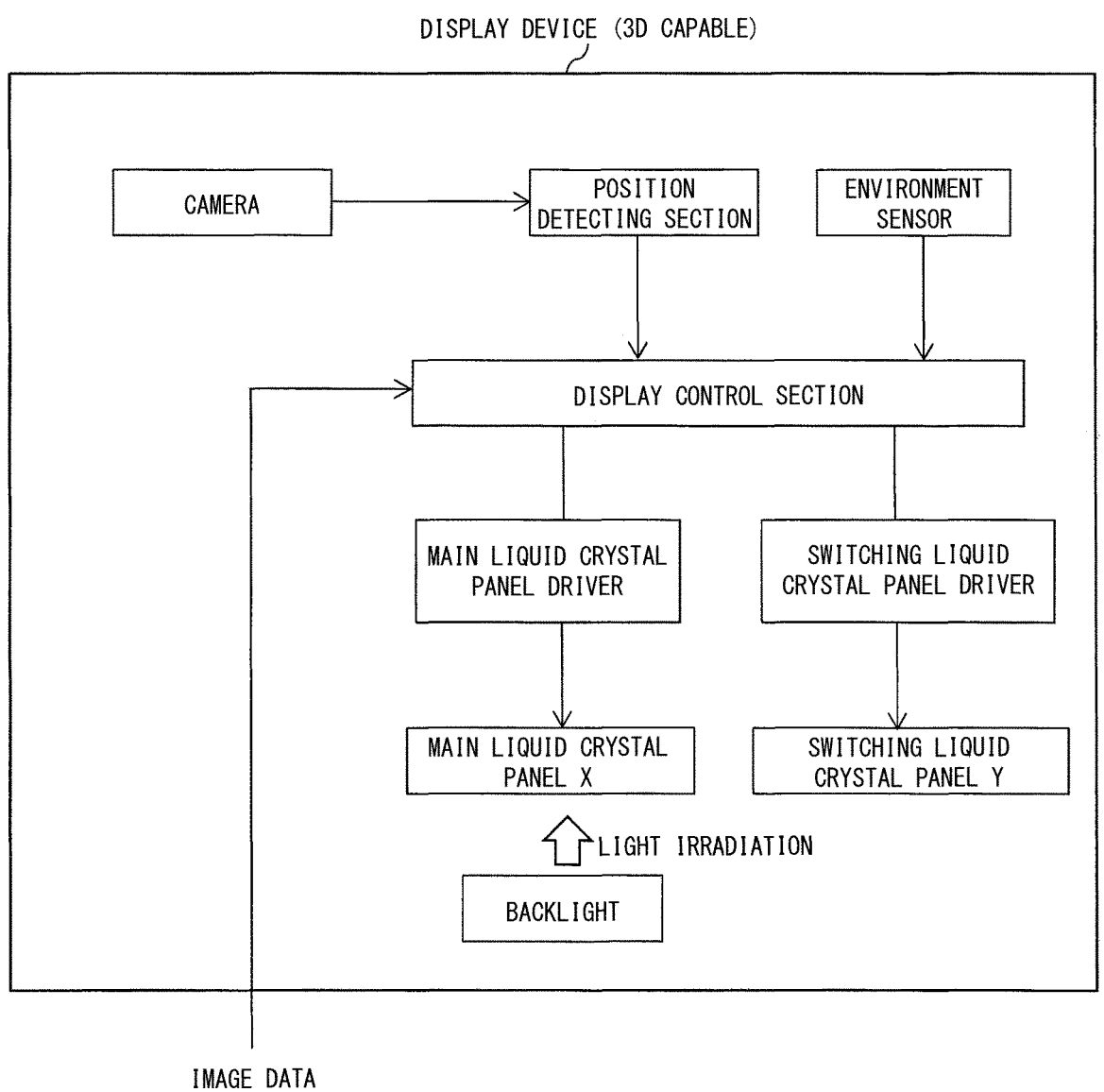
FIG. 37 is a block diagram illustrating a configuration of a display device in accordance with Embodiment 7.
Figure 38:
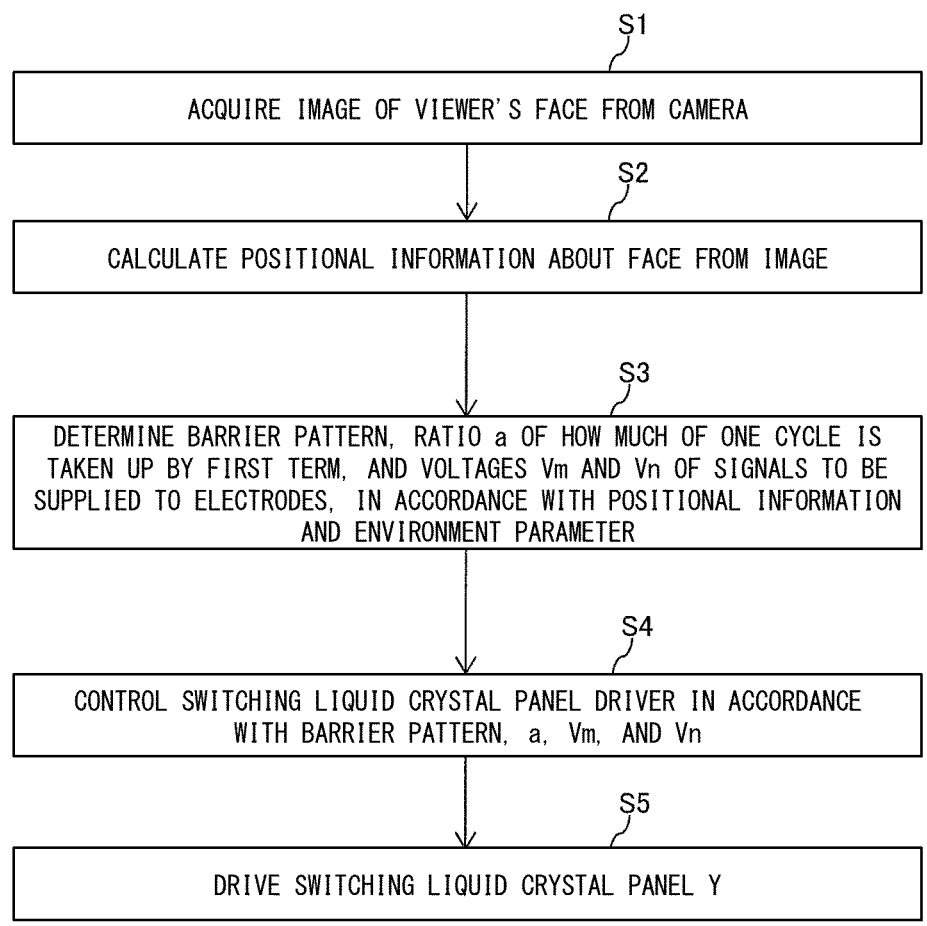
FIG. 38 is a flowchart illustrating a flow of a process carried out by the display device in accordance with Embodiment 7.

The display device used in Embodiments 1 to 6 is not limited to having the configuration illustrated in FIG. 2. As illustrated in FIG. 37, the display device may include an environment sensor configured to sense environmental parameters such as temperature and intensity of external light. With such a configuration, for example, as illustrated in FIG. 38, a position detecting section acquires, from a camera, an image of the viewer's face (step S1) and then calculates, from the image, positional information about the face (step S2). Thereafter, a display control section determines (i) a barrier pattern, (ii) a ratio a of how much of one cycle is taken up by the first term and (iii) voltages Vm and Vn of signals to be supplied to electrodes, the determination being made in accordance with the positional information and one or more environment parameters (for example, at least one of temperature and intensity of external light) sensed by the environment sensor (step S3). The display control section then controls the switching liquid crystal panel driver in accordance with the barrier pattern, the ratio a, and the voltages Vm and Vn thus determined (step S4). The switching liquid crystal panel Y is thus driven (step S5).

Embodiment 7 makes it possible to form a suitable barrier pattern in response to the environment (temperature, external light, etc.).

[Recap]

A display device in accordance with Aspect 1 of the present invention is a display device capable of three-dimensional displaying, including: a first liquid crystal panel configured to display an image; and a second liquid crystal panel configured to generate a parallax effect by use of a barrier in a light-blocking state and a slit in a light-transmitting state, the barrier and the slit being provided in an alternating manner along a first direction, in which during three-dimensional displaying for a viewing position β, in a first term, an entirety of a first predetermined region of the second liquid crystal panel takes on the light-blocking state and a first adjacent region, which is adjacent to the first predetermined region in the first direction, takes on the light-transmitting state, and in a second term, at least one of two side regions in the first predetermined region takes on the light-transmitting state, a remaining region of the first predetermined region takes on the light-blocking state, and at least part of the first adjacent region takes on the light-transmitting state.

With the above configuration, when viewed throughout both the first and second terms (throughout one cycle), the at least one of the two side regions displays gray (i.e., takes on a state between light transmitting and light blocking). This makes it possible to suppress a light concentration effect caused by the side regions and reduce changes in luminance (i.e., reduce flicker). Furthermore, because there is a region which is in a light-transmitting state throughout both the first and second terms (throughout one cycle), it is possible to secure the luminance of the display.

In Aspect 2 of the present invention, the display device of Aspect 1 is configured such that: the viewing position β and a viewing position γ are arranged in this order in the first direction; and during three-dimensional displaying for the viewing position γ, in the first term, an entirety of a second predetermined region, which is offset in the first direction from the first predetermined region, takes on the light-blocking state and a second adjacent region, which is adjacent to the second predetermined region in the first direction, takes on the light-transmitting state, and in the second term, at least one of two side regions in the second predetermined region takes on the light-transmitting state, a remaining region of the second predetermined region takes on the light-blocking state, and at least part of the second adjacent region takes on the light-transmitting state.

With the above configuration, it is possible to change the barrier pattern in accordance with the viewing position, and thus it is possible to widen the viewing angle during three-dimensional displaying.

In Aspect 3 of the present invention, the display device of Aspect 1 is configured such that: a viewing position α, the viewing position β and a viewing position γ are arranged in this order in the first direction; during three-dimensional displaying for the viewing position α, in each of the first term and the second term, the entirety of the first predetermined region takes on the light-blocking state and the first adjacent region takes on the light-transmitting state; and during three-dimensional displaying for the viewing position γ, in each of the first term and the second term, an entirety of a second predetermined region, which is offset in the first direction from the first predetermined region, takes on the light-blocking state and a second adjacent region, which is adjacent to the second predetermined region in the first direction, takes on the light-transmitting state.

With the above configuration, it is possible to substantially form a barrier pattern which is in a state between the barrier pattern of the viewing position α and the barrier pattern of the viewing position γ (i.e., to increase the number of barrier patterns).

This decreases the change in luminance occurring when a viewer moves from the viewing position α to the viewing position γ by passing through the viewing position β. Furthermore, because there is a region which is in a light-transmitting state throughout both the first and second terms (throughout one cycle), it is possible to secure the luminance of the display.

In Aspect 4 of the present invention, the display device of Aspect 1 is configured such that in the second term, each of the two side regions in the first predetermined region takes on the light-transmitting state.

In Aspect 5 of the present invention, the display device of Aspect 4 is configured such that the two side regions which take on the light-transmitting state in the second term are identical in width.

In Aspect 6 of the present invention, the display device of Aspect 4 is configured such that the two side regions which take on the light-transmitting state in the second term differ in width.

In Aspect 7 of the present invention, the display device of Aspect 1 is configured such that the second term is longer than the first term.

In Aspect 8 of the present invention, the display device of Aspect 1 is configured such that the first term and the second term are identical in length.

In Aspect 9 of the present invention, the display device of any one of Aspects 1 to 8 is configured such that each of the barrier and the slit is formed by controlling respective electric potentials of (i) a plurality of electrodes provided to a first substrate of the second liquid crystal panel and (ii) a plurality of electrodes provided to a second substrate of the second liquid crystal panel.

In Aspect 10 of the present invention, the display device of any one of Aspects 1 to 8 is configured such that each of the barrier and the slit is formed by controlling respective electric potentials of (i) a plurality of electrodes provided to a first substrate of the second liquid crystal panel and (ii) a common electrode provided to a second substrate of the second liquid crystal panel.

In Aspect 11 of the present invention, the display device of Aspect 9 is configured such that the plurality of electrodes provided to the first substrate of the second liquid crystal panel includes (i) a plurality of segment main electrodes provided along the first direction and (ii) a plurality of segment auxiliary electrodes provided along the first direction in a layer differing from a layer in which the plurality of segment main electrodes are provided, each of the plurality of segment auxiliary electrodes overlapping a gap between a pair of adjacent ones of the plurality of segment main electrodes.

In Aspect 12 of the present invention, the display device of any one of Aspects 1 to 11 is configured such that a ratio between a length of the first term and a length of the second term is set in accordance with an environment of the display device.

In Aspect 13 of the present invention, the display device of any one of Aspects 1 to 11 is configured such that a sum of a length of the first term and a length of the second term is set in accordance with an environment of the display device.

In Aspect 14 of the present invention, the display device of any one of Aspects 1 to 11 is configured such that (i) a sum of a length of the first term and a length of the second term and (ii) a ratio between the length of the first term and the length of the second term are set in accordance with an environment of the display device.

A method in accordance with Aspect 15 of the present invention is a method of driving a liquid crystal panel which is (i) provided to a display device capable of three-dimensional display and (ii) configured to generate a parallax effect by use of a barrier in a light-blocking state and a slit in a light-transmitting state, the barrier and the slit being provided in an alternating manner along a first direction, wherein during three-dimensional display for a viewing position β, in a first term, an entirety of a first predetermined region is caused to take on the light-blocking state and a first adjacent region, which is adjacent to the first predetermined region in the first direction, is caused to take on the light-transmitting state, and in a second term, at least one of two side regions in the first predetermined region is caused to take on the light-transmitting state, a remaining region of the first predetermined region is caused to take on the light-blocking state, and at least part of the first adjacent region is caused to take on the light-transmitting state.

With the above method, when viewed throughout both the first and second terms (throughout one cycle), the at least one of the two side regions displays gray (i.e., takes on a state between light transmitting and light blocking). This makes it possible to suppress a light concentration effect caused by the side regions and reduce changes in luminance (i.e., reduce flicker). Furthermore, because there is a region which is in a light-transmitting state throughout both the first and second terms (throughout one cycle), it is possible to secure the luminance of the display.

The present invention is not limited to the embodiments. The present invention also encompasses, in its technical scope, any embodiment derived by combining technical means disclosed in differing embodiments. It is possible to form a new technical feature by combining the technical means disclosed in the respective embodiments.

REFERENCE SIGNS LIST

X Main liquid crystal panel (first liquid crystal panel)
Y Switching liquid crystal panel (second liquid crystal panel)
Z Adhesive layer
D Segment substrate (first substrate)
F Counter substrate (second substrate)
1E to 6E Segment main electrode
7E to 12E Main counter electrode
H, J, K Polarizing plate
1E to 12E Segment electrode
Ux, Uy Liquid crystal layer

The invention claimed is:

1. A display device capable of three-dimensional displaying, comprising:
a first liquid crystal panel configured to display an image; and
a second liquid crystal panel configured to generate a parallax effect by use of a barrier in a light-blocking state and a slit in a light-transmitting state, the barrier and the slit being provided in an alternating manner along a first direction,
wherein during three-dimensional displaying for a viewing position β,
in a first term, an entirety of a first predetermined region of the second liquid crystal panel takes on the light-blocking state and a first adjacent region, which is adjacent to the first predetermined region in the first direction, takes on the light-transmitting state, and
in a second term, at least one of two side regions in the first predetermined region takes on the light-transmitting state, a remaining region of the first predetermined region takes on the light-blocking state, and at least part of the first adjacent region takes on the light-transmitting state;
wherein a viewing position α, the viewing position β and a viewing position γ are arranged in this order in the first direction;
wherein during three-dimensional displaying for the viewing position α, in each of the first term and the second term, the entirety of the first predetermined region takes on the light-blocking state and the first adjacent region takes on the light-transmitting state; and
wherein during three-dimensional displaying for the viewing position γ, in each of the first term and the second term, an entirety of a second predetermined region, which is offset in the first direction from the first predetermined region, takes on the light-blocking state and a second adjacent region, which is adjacent to the second predetermined region in the first direction, takes on the light-transmitting state.

2. A display device capable of three-dimensional displaying, comprising:
a first liquid crystal panel configured to display an image; and
a second liquid crystal panel configured to generate a parallax effect by use of a barrier in a light-blocking state and a slit in a light-transmitting state, the barrier and the slit being provided in an alternating manner along a first direction,
wherein during three-dimensional displaying for a viewing position β,
in a first term, an entirety of a first predetermined region of the second liquid crystal panel takes on the light-blocking state and a first adjacent region, which is adjacent to the first predetermined region in the first direction, takes on the light-transmitting state,
in a second term, at least one of two side regions in the first predetermined region takes on the light-transmitting state, a remaining region of the first predetermined region takes on the light-blocking state, and at least part of the first adjacent region takes on the light-transmitting state, and in the second term, each of the two side regions in the first predetermined region takes on the light-transmitting state.

3. The display device according to claim 2, wherein the two side regions which take on the light-transmitting state in the second term are identical in width.

4. The display device according to claim 2, wherein the two side regions which take on the light-transmitting state in the second term differ in width.

5. The display device according to claim 2, wherein the second term is longer than the first term.

6. The display device according to claim 1, wherein the first term and the second term are identical in length.

7. The display device according to claim 1, wherein a ratio between a length of the first term and a length of the second term is set in accordance with an environment of the display device.

8. The display device according to claim 1, wherein a sum of a length of the first term and a length of the second term is set in accordance with an environment of the display device.

9. The display device according to claim 1, wherein (i) a sum of a length of the first term and a length of the second term and (ii) a ratio between the length of the first term and the length of the second term are set in accordance with an environment of the display device.

10. The display device according to claim 2, wherein a ratio between a length of the first term and a length of the second term is set in accordance with an environment of the display device.

11. The display device according to claim 2, wherein a sum of a length of the first term and a length of the second term is set in accordance with an environment of the display device.

12. The display device according to claim 2, wherein (i) a sum of a length of the first term and a length of the second term and (ii) a ratio between the length of the first term and the length of the second term are set in accordance with an environment of the display device.

* * * * *